(12) United States Patent
Garoff et al.

(10) Patent No.: US 6,706,655 B2
(45) Date of Patent: Mar. 16, 2004

(54) CATALYST COMPONENT COMPRISING MAGNESIUM, TITANIUM, A HALOGEN AND AN ELECTRON DONOR, ITS PREPARATION AND USE

(75) Inventors: Thomas Garoff, Helsinki (FI); Timo Leinonen, Tolkkinen (FI); Sirpa Ala-Huikku, Helsinki (FI)

(73) Assignee: Borealis Technology Oy, Porvoo (FI)

( * ) Notice: Subject to any disclaimer, the term of this patent is extended or adjusted under 35 U.S.C. 154(b) by 306 days.

(21) Appl. No.: 09/774,580

(22) Filed: Feb. 1, 2001

(65) Prior Publication Data

US 2001/0008869 A1 Jul. 19, 2001

Related U.S. Application Data

(63) Continuation of application No. PCT/FI99/00658, filed on Aug. 9, 1999.

(30) Foreign Application Priority Data

Aug. 7, 1998 (FI) .................................................. 981718

(51) Int. Cl.$^7$ ................................................ B01J 31/04
(52) U.S. Cl. ........................ 502/125; 502/103; 502/115; 526/348; 526/124.3; 526/123.1; 526/142
(58) Field of Search ............................... 502/103, 125, 502/115; 526/348, 124.3, 123.1, 142

(56) References Cited

U.S. PATENT DOCUMENTS 4,804,648 A    2/1989  Job
5,118,767 A    6/1992  Job

FOREIGN PATENT DOCUMENTS

| EP | 0 173 472 A2 * | 3/1986 |
| EP | A2195497 | 9/1986 |
| EP | 0226004 A1 * | 6/1987 |
| EP | A1226004 | 6/1987 |
| EP | A1260507 | 3/1988 |
| EP | A3683175 | 11/1995 |
| EP | A2173472 | 3/1996 |
| EP | 748820 | 12/1996 |
| EP | A1926165 | 6/1999 |
| FI | 96615 | 4/1996 |

* cited by examiner

Primary Examiner—Ling-Siu Choi
(74) Attorney, Agent, or Firm—Birch, Stewart, Kolasch & Birch, LLP

(57) ABSTRACT

The invention relates to a new process for the preparation of an olefin polymerization catalyst component, as well as a new polymerization catalyst component and its use. In the process, a magnesium dialkyl or diahlide or alkyl alkoxide is reacted with an alcohol and the reaction product is reacted with an unsaturated dicarboxylic acid dihalide and a titanium tetrahalide. Especially good catalyst activity and morphology are achieved by using a polyhydric alcohol such as ethylene glycol.

53 Claims, 9 Drawing Sheets

CATALYST COMPONENT COMPRISING MAGNESIUM, TITANIUM, A HALOGEN AND AN ELECTRON DONOR, ITS PREPARATION AND USE

This application is a Continuation of PCT International Application No. PCT/FI99/00658 filed on Aug. 9, 1999, which designated the United States, and on which priority is claimed under 35 U.S.C. § 120, the entire contents of which are hereby incorporated by reference.

The invention relates to a process for the preparation of an olefin polymerization catalyst component comprising a magnesium dihalide, a titanium tetrahalide, and a dicarboxylic acid di-, oligo- and/or polyester as internal electron donor. The invention also relates to such a catalyst component and its use for the polymerization of α-olefins such as propene.

BACKGROUND OF THE INVENTION

Generally, so called Ziegler-Natta catalyst components of the above kind have been prepared by reacting a magnesium halide-alcohol complex support with a titanium tetrahalide and an electron donor which usually is a phthalic acid di-, oligo- or polyester. The preparation involves the use of large amounts of reagents and washing liquids, which are difficult to handle. Additionally, byproducts are formed, which cannot easily be regenerated or destroyed, but form an environmental problem.

For example, the preparation of a conventional polypropene catalyst component involves the reaction of a magnesium dichloride-alcohol complex support with titanium tetrachloride to give a reactive β-magnesium dichloride surface as intermediate and hydrogen chloride and titanium alkoxy trichloride as byproducts. Then, the reactive β-magnesium dichloride surface is activated with further titanium tetrachloride to give said catalyst component (the treatment with a titanium halide such as titanium tetrachloride is henceforth called titanation). This gives an inert magnesium chloride-based support covered with active sites based on titanium, chlorine and, optionally, an internal electron donor.

The titanium alkoxy trichloride byproduct formed in said titanation is a catalyst poison and must be carefully removed by extensive washing using large amounts of titanium tetrachloride. Further, the titanium alkoxy trichloride must be carefully separated from the titanium tetrachloride washing liquid, if the latter is to be reused e.g. for activating the reactive β-magnesium dichloride. Finally, the titanium alkoxy trichloride is a hazardous waste material, which is difficult to dispose of.

Thus, in a typical propene polymerization catalyst component preparation involving two titanations and three heptane washes, one mol of produced catalyst component (mol Mg) requires about 40 mol of titanium tetrachloride e.g. as washing liquid to be circulated, and produces as waste material an amount of about three mol of titanium alkoxy trichloride as well as about three mol of hydrogen chloride.

Sumitomo, EP 0 748 820 A1 (hereinafter referred to as "Sumitomo"), has prepared dialkoxy magnesium, reacted it with titanium tetrachloride to form an intermediate and then reacted the intermediate with phthalic acid dichloride to form a catalytically active propene polymerization catalyst component. The activity was raised by repeated titanations, as well as repeated washes with toluene and hexane. See page 10, lines 14 to 37, of said publication.

Said process of Sumitomo has avoided the reaction between the solid magnesium dichloride-alcohol complex and liquid titanium tetrachloride, and thereby eliminated the formation of large quantities of catalytically poisonous titanium alkoxy trichloride byproduct. However, as much as four titanations and hydrocarbon treatments are still needed to give satisfactory catalytic activity.

Further, conventional processes based on titanium trichloride and on titanium tetrachloride covered magnesium dichloride give catalyst component particles of either the wrong size or too broad a particle size distribution. As the relative size and size distribution of the catalyst component particles are reproduced in the olefin polymer (the so called "replication"-phenomena), this is reflected as morphology problems in the polymer product. Such problems are, e.g., fouling of the polymerization reactor and clogging of its piping due to the presence of too much fines.

DESCRIPTION OF THE INVENTION

The purpose of the present invention is to provide a process which results in a catalyst component having satisfactory activity without producing harmful byproducts such as said titanium alkoxy trichloride or requiring the use of large amounts of titanation reagent and/or washing liquid. A further purpose of the invention is to obtain a catalyst component which has the right particle size and size distribution, so that a suitable polymer will be obtained without disturbances in the polymerization process.

The problem described above has now been solved with a novel process for the preparation of a catalyst component of the above type, which is mainly characterized by the steps of:

(i) reacting in solution at least one magnesium compound (a), selected from the group consisting of a dialkyl magnesium $R_2Mg$, an alkyl magnesium alkoxide RMgOR, wherein each R is a similar or different $C_1$–$C_{20}$ alkyl, and a magnesium dihalide $MgX_2$, wherein X is a halogen, with at least one alcohol (b), selected from the group consisting of a mixture of at least one monohydric alcohol R'OH and at least one polyhydric alcohol $R'(OH)_m$, and at least one polyhydric alcohol $R'(OH)_m$, wherein R' is an 1-valent or, respectively, an m-valent $C_1$–$C_{20}$ hydrocarbyl group and m is an integer selected from 2, 3, 4, 5 and 6, to give a first intermediate (ab), and (ii) reacting in solution said first intermediate (ab) with at least one dicarboxylic acid dihalide (c) which forms essentially all of said carboxylic acid di-, oligo- and/or polyester and has the formula (1):

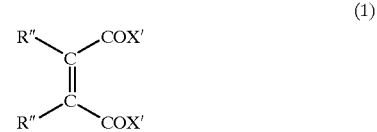

(1)

wherein each R'' is a similar or different $C_1$–$C_{20}$ hydrocarbyl group or both R'':s form together with the two unsaturated carbons of the formula a $C_5$–$C_{20}$ aliphatic or aromatic ring, and X' is a halogen, to give a second intermediate (abc), and (iii) reacting said second intermediate (abc) with at least one titanium tetrahalide $TiX''_4$ (d) wherein X'' is a halogen, (iv) recovering by precipitation said catalyst component in crude form, or a precursor of said catalyst component, and (v) optionally washing said crude catalyst component or said precursor, to give said catalyst component.

It has thus been found that a high activity olefin polymerization catalyst comprising a magnesium halide, a titanium tetrahalide and a dicarboxylic acid di-, oligo- and/or polyester as internal donor can be prepared without the above mentioned disadvantages by reacting the reaction product of a dialkyl magnesium or a magnesium halide and a polyhydric alcohol with a dicarboxylic acid dihalide and a titanium tetrahalide. Further, by means of the polyhydric alcohol, the morphology of the catalyst component and thus the morphology of the polymer can be controlled and improved.

Of the above mentioned steps (i) to (iii), preferably all are performed in solution. If necessary, one or several hydrocarbon solvents, optionally with the application of stirring and/or heating, can be used to dissolve the reactants. Performing the process in a solution means that all reagent molecules have access to, and can react with, each other, thus forming a homogenous reaction product. Earlier processes which have been performed by reacting a solid support with a titanium compound and an electron donor, do not form this kind of homogenous reaction products. See the above description of earlier technique.

The catalyst component is in step (iv) preferably recovered in solid form by precipitation. Precipitation in the present invention means that the reaction product formed in solution is recovered as a powder, the particles of which comprise similar individual molecules of that reaction product. It is thus distinguished from earlier processes which include first the precipitation of a support and then the reaction of the support surface with catalytically active component(s). The particles formed according to the present invention are thus homogenous, while the particles of earlier processes are more or less heterogenous (inert core+active surface).

It is preferable if said first and second intermediates as well as the final product of the claimed process are separate compounds with an essentially stoichiometric composition. Often, they are complexes. A complex is, according to Römpps Chemie-Lexicon, 7. Edition, Franckh'sche Verlagshandlung, W. Keller & Co., Stuttgart, 1973, page 1831, "a derived name of compounds of higher order, which originate from the combination of molecules,—unlike compounds of first order, in the creation of which atoms participate.

The process according to the present invention starts with step (i), in which a dialkyl magnesium or a magnesium dihalide is reacted with a polyhydric alcohol R'(OH)$_m$ or a mixture thereof with a monohydric alcohol R'OH. The use of a polyhydric alcohol R'(OH)$_m$ improves both the activity and the morphology of the catalyst component compared to the use of a monohydric alcohol alone. It is also possible to react all magnesium compounds (a) separately with a monohydric alcohol or a polyhydric alcohol, or a mixture of them. In the formulas, each R' can be the same or different.

Typical polyhydric alcohols are ethylene glycol, propylene glycol, trimethylene glycol, 1,2-butylene glycol, 1,3-butylene glycol, 1,4-butylene glycol, 2,3-butylene glycol, 1,5-pentanediol, 1,6-hexanediol, 1,8-octanediol, pinacol, diethylene glycol, triethylene glycol, glycerol, trimethylol propane and pentareythritol. The polyhydric alcohol can be selected on the basis of the activity and morphology it gives the catalyst component. Thus, for example, ethylene glycol gives a high activity catalyst component, large polymer (PP) particles and a broad polymer particle size distribution. Compared to ethylene glycol, 2-butyl-2-ethyl-1,3-propanediol gives a moderate activity, small polymer particles and a very narrow polymer particle size distribution.

According to one embodiment of the present invention, the polyhydric alcohol has the formula R'(OH)$_m$, wherein R' is a di-, tri- or tetravalent C$_2$–C$_{16}$ alkyl group and m is an integer selected from 2, 3, 4, 5 and 6. Preferably, R' is a divalent or a trivalent C$_2$–C$_{16}$ alkyl group and m is an integer selected from 2 and 3. Most preferably the polyhydric alcohol is selected from the group consisting of ethylene glycol and 2-butyl-2-ethyl- 1,3-propanediol. By valence is understood the number of bonds that an atom can form (Stanley H. Pine, Organic Chemistry, 5. edition, McGraw-Hill, Inc., New York, 1987, page 10).

The amount of polyhydric alcohol may vary a lot, depending on the used amounts of magnesium compound (a), dicarboxylic acid dihalide (c) and the reactive halogenated hydrocarbon (e) described below. While the polyhydric alcohol certainly reacts with the magnesium compound, it may also be involved in reaction with the dicarboxylic acid dihalide (c), and/or even with the reactive halogenated hydrocarbon (e) described below. According to a preferred embodiment, said magnesium compound (a) is in step (i) reacted with said polyhydric alcohol R'(OH)$_m$ in a molar ratio Mg/R'(OH)$_m$ of between 1:1 and 1:0.25, preferably between about 1:0.8 and about 1:0.3.

Even better results are obtained if in step (i), said magnesium compound (a) is reacted with at least two of said alcohols (b). It is preferable to use as said at least one alcohol (b) a mixture of at least one monohydric alcohol R'OH and at least one polyhydric alcohol R'(OH)$_m$.

According to an embodiment of the invention, said magnesium compound (a) is reacted separately with at least one monohydric alcohol R'OH and at least one polyhydric alcohol R'(OH)$_m$. The intermediate solutions obtained are further reacted with said at least one dicarboxylic acid dihalide. These solutions are then mixed and the mixture is reacted with said at least one titanium tetrahalide.

Typical C$_1$–C$_5$ monohydric alcohols are methanol, ethanol, n-propanol, iso-propanol, n-butanol, iso-butanol, sec.butanol, tert.butanol, n-amyl alcohol, iso-amyl alcohol, sec.amyl alcohol, tert.amyl alcohol, diethyl carbinol, akt.amyl alcohol, sec.isoamyl alcohol, tert.butyl carbinol. Typical C$_6$–C$_{10}$ monohydric alcohols are hexanol, 2-ethyl-1-butanol, 4-methyl-2-pentanol, 1-heptanol, 2-heptanol, 4-heptanol, 2,4-dimethyl-3-pentanol, 1-octanol, 2-octanol, 2-ethyl-1-hexanol, 1-nonanol, 5-nonanol, diisobutyl carbinol, 1-decanol and 2 ,7-dimethyl-2-octanol. Typical >C$_{10}$ monohydric alcohols are n-1-undecanol, n-1-dodecanol, n-1-tridecanol, n-1-tetradecanol, n-1-pentadecanol, 1-hexadecanol, n-1-heptadecanol and n-1-octadecanol. The monohydric alcohols may be unsaturated, as long as they do not act as catalyst poisons.

Preferable monohydric alcohols are those of formula R'OH in which R' is a C$_2$–C$_{16}$ alkyl group, most preferably a C$_4$–C$_{12}$ alkyl group, like 2-ethyl-1-hexanol.

The quality and quantity of monohydric alcohol relative to the amount of magnesium compound (a) may vary a lot, depending on the used quality and quantity of polyhydric alcohol, magnesium compound (a), dicarboxylic acid dihalide (c) and reactive halogenated hydrocarbon (e). The molar ratio Mg/R'OH is preferably between about 1:5 and about 1:1, more preferably between about 1:4 and about 1:1, most preferably between about 1:2.5 and about 1:1.5.

The dialkyl magnesium (a) used in step (i) has the formula R$_2$Mg or RMgOR, wherein each one of the two R:s is a similar or different C$_1$–C$_{20}$ alkyl, preferably a similar or different C$_4$–C$_{12}$ alkyl. Typical magnesium alkyls are ethylbutyl magnesium, dibutyl magnesium, dipropy magnesium, propylbutyl magnesium, dipentyl magnesium, butylpentylmagnesium, butyloctyl magnesium and dioctyl magnesium. Typical alkyl-alkoxy magnesium compounds are ethyl magnesium butoxide, magnesium dibutoxide, butyl magnesium pentoxide, magnesium dipentoxide, octyl magnesium butoxide and octyl magnesium octoxide. Most preferably, one R of the suitable formula $R_2Mg$ is a butyl group and the other R is an octyl group, i.e. the dialkyl magnesium compound is butyl octyl magnesium. When used as said magnesium compound (a), the preferred magnesium dihalide is magnesium dichloride $MgCl_2$.

It is also possible to used both a magnesium dihalide and a dialkyl magnesium for example as follows:

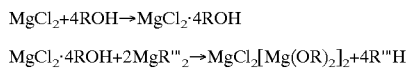

$MgCl_2 + 4ROH \rightarrow MgCl_2 \cdot 4ROH$ $MgCl_2 \cdot 4ROH + 2MgR'''_2 \rightarrow MgCl_2[Mg(OR)_2]_2 + 4R'''H$ The reaction conditions used in step (i) of the claimed process may be varied according to the used reactants and agents. The conditions should be adjusted to give sufficiently of said reaction product (ab) between the magnesium compound (a) and said alcohol(s) (b). According to an embodiment of the present invention, said magnesium compound (a) is reacted with said at least one alcohol (b), under at least one of the following conditions:

at raised temperature, preferably at about 30° C. to about 80° C., for a period of about 10 min to about 90 min, preferably about 30 min, in the presence of a $C_5-C_{10}$ hydrocarbon solvent, preferably heptane.

In addition to the above embodiments of step (i), other variations and reactions may also be used to produce said first intermediate (ab), still being within the present scope of protection. Thus, with respect to step (i), the scope of protection should be interpreted under the doctrine of equivalence on the basis of what a skilled person could have done to achieve said first intermediate (ab).

According the invention, the product of step (i), or a similar composition, i.e. said first intermediate (ab), is in a succeeding step (ii) reacted with a dicarboxylic acid dihalide (c) of the formula (1) to give a second intermediate (abc), and said second intermediate (abc) is in a third step (iii) reacted with a titanium tetrahalide $TiX''_4$ (d) wherein X" is a halogen.

The formula (1) of the dicarboxylic acid dihalide is:

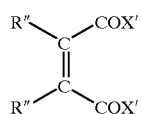

(1)

wherein each R" is a similar or different $C_1-C_{20}$ hydrocarbyl group or both R":s form together with the two unsaturated carbons seen in the formula a $C_5-C_{20}$ aliphatic or aromatic ring, and X' is a halogen.

Among non-cyclic dicarboxylic acid dihalides, the group consisting of maleic acid dihalide, fumaric acid dihalide and their R" substituted derivatives such as citraconic acid dihalide and mesaconic acid dihalide, respectively, are the most important. As the invention aims at converting the dicarboxylic acid dihalides into their corresponding di-, oligo- or polyesters, and the di-, oligo- or polyesters as internal electron donors have to be coordinable with the magnesium dihalide and the titanium tetrahalide of the catalyst component, the cis-isomeric maleic acid dihalide and its derivatives, such as citraconic acid dihalide, are more advantageous.

However, in order to obtain a catalyst with exceptionally high activity, the R":s of formula (1) should form together with the two unsaturated carbons seen in the formula a $C_5-C_{20}$ aliphatic or aromatic ring. Among the cyclic dicarboxylic acid dihalides, the group consisting of phthalic acid dihalide (1,2-benzene dicarboxylic acid dihalide), its hydrogenate 1,2-cyclohexane dicarboxylic acid diahlide, and their derivatives, is the most important. Most preferably, said dicarboxylic acid dihalide (c) is phthaloyl dichloride.

The amount of the dicarboxylic acid dihalide (c) may vary a lot, depending on the amount of alcohol (b) used in step (i) and the amount of alkoxide present in said first intermediate (ab). It is within the scope of protection of the present patent to adjust the amounts in order to react said intermediate with said dicarboxylic acid dihalide. According to a preferred embodiment of the present invention, in step (ii), said first intermediate (ab) is reacted with said dicarboxylic acid halide (c) in a molar ratio $Mg_{total\ added}/(c)$ of between 1:1 and 1:0.1, preferably between about 1:0.6 and about 1:0.25.

The reaction conditions of step (ii) of the claimed process may vary according to the used components and their amounts. However, they should be adjusted to give sufficiently of said reaction product (abc) between said intermediate (ab) and said dicarboxylic acid dihalide (c). According to an embodiment of the present invention, in step (ii), said first intermediate (ab) is reacted with said dicarboxylic acid dihalide (c), under at least one of the following conditions:

adding said dicarboxylic acid dihalide (c) under room temperature and heating the obtained reaction mixture, keeping the reactants together at raised temperature, preferably at about 30° C. to about 80° C., keeping the reactants together for a period of about 10 min to about 90 min, preferably about 30 min, reacting the reactants in the presence of a $C_5-C_{10}$ hydrocarbon solvent, preferably heptane.

Usually, a $C_5-C_{10}$ hydrocarbon solvent is used in step (ii). Then, it is preferable, that, after said first intermediate (ab) has been reacted with said dicarboxylic acid dihalide (c), the $C_5-C_{10}$ hydrocarbon solvent is removed by evaporation, e.g. that heptane is used and removed at about 100° C. to about 110° C.

In the invention, it was found that the addition of at least one reactive halogenated hydrocarbon (e) during the process, i.e. in any of the above steps (i) to (iii), led to a further improved catalytic activity. The reactive halogenated hydrocarbon (e) has the formula (2)

$R'''X'''_n$ (2)

wherein R''' is an n-valent $C_1-C_{20}$ hydrocarbyl group, X''' is a halogen and n is an integer selected from 1, 2, 3 and 4.

Such chlorinated hydrocarbons are, e.g., monochloromethane, dichloromethane, trichloromethane (chloroform), tetrachloromethane, monochloroethane, 1,1-dichloroethane, 1,2-dichloroethane, 1,1,1-trichloroethane, 1,1,2-trichloroethane, 1,1,1,2-tetrachloroethane, 1,1,2,2-tetrachloroethane, pentachloroethane, hexachloro-ethane, 1-chloropropane, 2-chloropropane, 1,2-dichloropropane, 1,3-dichloro-propane, 1,2,3-trichloropropane, 1-chlorobutane, 2-chlorobutane, isobutyl chloride, tert.butyl chloride, 1,4-dichlorobutane, 1-chloropentane, 1,5-dichloropentane. The chlorinated hydrocarbons of the invention may also be unsaturated, provided that the unsaturation does not act as catalyst poison in the final catalyst component.

In said reactive halogenated hydrocarbon (e) having the above formula (2), R'" is preferably a mono-or bivalent $C_1$–$C_{10}$ hydrocarbyl group, independently, X'" is preferably chlorine and, independently, n is preferably 1 or 2. Preferably said hydrocarbyl halide (e) is a butyl chloride (BuCl) or a dichloroalkane like 1,4-dichlorobutane, more preferably tertiary butyl chloride or a dichloroalkane like 1,4-dichlorobutane, most preferably a dichloroalkane like 1,4-dichlorobutane.

It was also found, that especially good results were obtained, if said reactive halogenated hydrocarbon (e) is added in an amount corresponding to a molar ratio $Mg_{total\ added}$/(e) of between 1:0.2 and 1:20, preferably between about 1:1 and about 1:4.

Said reactive halogenated hydrocarbon (e) can be added in any of steps (i) to (iii). Preferably it is added in connection with step (ii). This means that in the process, it is preferably added immediately before the dicarboxylic acid dihalide (c), together with it or immediately after it. As there is a possibility that the reactive halogenated hydrocarbon (e) may disturbe the conversion of the dicarboxylic acid dihalide into said dicarboxylic acid di-, oligo- and/or polyester donor, it is most preferably added immediately after the addition of the dicarboxylic acid dihalide (c). The symbols (ab) and (abc) may or may not include the added or reacted reactive halogenated hydrocarbon (e). The symbols do not limit the reactants leading to the corresponding intermediates to (a), (b), (c) and (d).

As was said above, it is preferable to add said reactive halogenated hydrocarbon (e) in connection with and preferably after the dicarboxylic acid dihalide (c), i.e. at the end of step (ii). Most preferably, after said preferable $C_5$–$C_{10}$ hydrocarbon solvent, such as heptane, has been removed by evaporation after step (ii), said second intermediate (abc) is contacted with said reactive halogenated hydrocarbon (e). A convenient contacting period is about 10 min to about 90 min, preferably about 30 min.

In the reaction sequence (i)→(ii)→(iii), after said second intermediate (abc) has been contacted with said reactive halogenated hydrocarbon (e), preferable in step (ii), a dissolving $C_5$–$C_{10}$ hydrocarbon, such as toluene, is preferably added. Without limiting the scope of patent protection, the hydrocarbon is believed to dissolve the reaction product and/or the lower the viscosity of its solution, thus making the intermediate (abc, including (e)) more available for reaction with the titanium tetrahalide $TiX''_4$ (d) in the succeeding step (iii). Most preferably molar ratio $Mg_{total\ added}$/toluene of between about 1:2 and about 1:10 is used in the addition.

In step (iii), the magnesium compound/alcohol/dicarboxylic acid dihalide reaction product (abc) is reacted with at least one titanium tetrahalide $TiX''_4$ (d), wherein X" is a halogen. Equivalent with said titanium tetrahalide is the combination of an alkoxy titanium halide and a halogenation agent thereof, which are able to form a titanium tetrahalide in situ. However, the most preferred titanium tetrahalide (d) is titanium tetrachloride.

The amount of titanium tetrahalide may vary a lot and depends e.g. on the manner of contacting it with said intermediate (abc). If the titanium tetrahalide is added to the intermediate, a large stoichiometric excess thereof is not needed. If, however, the intermediate, or solution thereof, are added e.g. dropwise to the titanium tetrahalide, a large stoichiometric excess of the last mentioned is preferred. Within the scope of the claimed process, the amount of titanium tetrahalide may be optimized to give a suitable catalyst. Most preferably, in step (iii), said second intermediate (abc) is added into and reacted with said titanium tetrahalide (d) in a molar ratio $Mg_{total\ added}$/(d) of between 1:100 and 1:1, preferably between about 1:50 and about 1:5, most preferably about 1:10.

As was said before, both order of contacting between said intermediate (abc) and said titanium tetrahalide give satisfactory results and may be applied to the present invention. When using the reaction sequence (i)→(iii), it is preferable if in step (iii), said second intermediate (abc), more preferably a solution thereof, is added slowly, most preferably dropwise, to said titanium tetrahalide (d) to form a solution of said catalyst component. Thereby, the titanium tetrahalide is preferably hot, most preferably at 110° C. The best results are obtained, if in step (iii), a toluene solution of said second intermediate (abc) is added dropwise to said titanium tetrahalide (d) at 110° C. The corresponding reaction time is preferably about 5 min to about 20 min, most preferably about 10 min.

After the reaction sequences (i)→(ii)→(iii), the reaction product, which is a precursor of, or a crude version of said catalyst component, is recovered in a recovery step (iv). The reaction product is preferably recovered by continuously heating a solution of said catalyst component, most preferably said toluene solution of said catalyst component, for the precipitation of the catalyst component in crude form or as said precursor and allowing it to settle. Immediately before said precipitation, preferably a $C_5$–$C_{10}$ hydrocarbon solvent, more preferably toluene, most preferably toluene in a molar ratio $Mg_{total\ added}$/toluene of about 1:10 to about 1:100, is added to said catalyst component solution. After the crude catalyst component or said precursor has settled, the supernatant liquid is removed e.g. by decantering or siphoning.

After the recovery step (iv), said catalyst component in crude form or said precursor is optionally washed in a washing step (v). By precursor is meant a reaction product, which still is not in the form of the final catalyst component. This state of thing derives from the nature of the reaction product, which may be a larger complex (see definition above) or mixture consisting of or containing one or several molecules and/or smaller complexes. Because of the loose structure of such a larger complex or complex mixture, washing will remove some of the complexes and/or molecules and essentially change the composition of the remaining solid product.

It is preferable if, in step (v), said recovered catalyst component in crude form or said catalyst component precursor is washed with toluene, preferably with hot (e.g. 90° C.) toluene. It is further preferable, if in step (v), said recovered crude catalyst component, said recovered precursor or said preliminary washed catalyst component is washed with heptane, most preferably with hot (e.g. 90° C.) heptane. Yet further, it is preferable, if in step (v), said recovered crude catalyst component, said recovered precursor or said preliminary washed catalyst component is washed with pentane. A washing step (v) typically includes several substeps which gradually increase the magnesium dihalide content of the catalyst precursor. Such a washing sequence is, for example, one wash with toluene at 90° C., two washes with heptane at 90° C. and one wash with pentane at room temperature.

The washing can according to the invention be optimized to give a catalyst with novel and desirable properties. Thus in step (v) said recovered catalyst component is preferably washed to give the following ratio of said magnesium dihalide, said titanium tetrahalide, and said dicarboxylic acid di-, oligo- and/or polyester as internal electron donor ED (3):

$$(MgX_2)_{8-10}(TiX''_4)_1(ED)_{0.7-1.3} \qquad (3)$$

wherein $MgX_2$ is said magnesium dihalide, $TiX''_4$ is said titanium tetrahalide, and ED is said dicarboxylic acid di-, oligo- and/or polyester as internal electron donor, preferably a phthalic acid di-, oligo- or polyester. X and X" are preferably Cl.

Finally, the washed catalyst component is usually dried, preferably by evaporation.

In appendices 1 and 2 are described the schemes of eight (sixteen) embodiments of the present invention; four (eight) starting from a magnesium dihalide $MgX_2$ and four (eight) starting from a dialkyl magnesium $R_2Mg$.

In addition to the above described process, the invention also relates to an olefin polymerization catalyst component comprising a magnesium dihalide, a titanium tetrahalide, and a dicarboxylic acid ester as internal electron donor ED, which has been prepared according to the above described process. By said catalyst component is meant the so called procatalyst component, i.e. the transition metal component of the whole olefin catalyst system, which catalyst system additionally includes a so called cocatalyst, i.e. an organic compound of a non-transition metal, and optionally a so called external electron donor.

An advantageous embodiment of the catalyst component according to the present invention comprises a magnesium dihalide, a titanium tetrahalide, and a dicarboxyl acid ester as internal electron donor ED and has the following ratio of said magnesium dihalide, said titanium tetrahalide, and said dicarboxylic acid ester as internal electron donor ED (3):

$$(MgX_2)_{8-10}(TiX''_4)_1(ED)_{0.7-1.3} \quad (3)$$

wherein $MgX_2$ is said magnesium dihalide, $TiX''_4$ is said titanium tetrahalide and ED is said dicarboxylic acid ester as internal electron donor, preferably a phthalic acid di-, oligo- or polyester. Especially, this applies for X=X"=Cl. This composition gives the highest activity. Preferably, the catalyst component is a complex having the formula (3).

When using a polyol $R'(OH)_m$, wherein R' is an m-valent $C_1-C_{20}$ hydrocarbyl group and m is an integer selected from 2, 3, 4, 5 and 6, according to the present invention, its morphology can conveniently be adjusted to give olefin polymers of various desired particle sizes and particle size distributions (PSD). As was said above, the polyhydric alcohol can be selected on the basis of the activity and morphology it gives to the catalyst component. Thus ethylene glycol gives a high activity catalyst component, large polymer (PP) particles and a broad polymer particle size distribution, whereas 2-butyl-2-ethyl-1,3-propanediol gives a moderate activity, small polymer particles and a very narrow particle size distribution.

When adding during the preparation process of the claimed catalyst component a reactive halogenated hydrocarbon (e) of the formula (2)

$$R'''(X''')_n \quad (2)$$

wherein R''' is an n-valent $C_1-C_{20}$ hydrocarbyl group, X''' is a halogen and n is an integer selected from 1, 2, 3 and 4, the product will preferably contain more halogen than was to be expected on the basis of the $MgX_2$ and $TiX_4$ present. Preferably, when the halogen is chlorine, the claimed catalyst component might contain chlorine from about 10% to about 60% more than the amount of chlorine calculated on the basis of the amounts of magnesium and titanium present, assuming that all of the magnesium is in the form of said $MgCl_2$ and essentially all of the titanium is in the form of said $TiCl_4$.

In the claimed catalyst component, the magnesium halide (X=Cl) structure has an X-ray diffraction pattern which differs from the X-ray diffraction pattern of pure $MgCl_2$. It preferably shows an X-ray diffraction pattern with a lamellar thickness indicating peak at 17° 2Θ, showing a clear position shift compared to normal amorphous $MgCl_2$ which gives a height indicating peak at 15° 2Θ. Indeed, according to J. Dorrepaal et al. (J. Appl. Crystallography, 1984 17, page 483), the crystal structure of $MgCl_2$ is characterized by a=3,640 Å and C=17,673 Å. In an X-ray diffraction pattern the peak at about 15° 2Θ is in the direction (003) of the c-axis, i.e. describing the height to the hexagonal unit cell, when Cu Kα radiation is used.

In addition to the above described process and catalyst component, the invention also relates to a process for the polymerization of olefins. The process is characterized by the steps of (A) preparing in solution an olefin catalyst component by
  (i) reacting at least one magnesium compound (a), selected from the group consisting of a dialkyl magnesium $R_2Mg$, wherein each R is a similar or different $C_1-C_{20}$ alkyl, and a magnesium dihalide $MgX_2$, wherein X is a halogen, with at least one alcohol (b), selected from the group consisting of a mixture of at least one monohydric alcohol R'OH and at least one polyhydric alcohol $R'(OH)_m$, and at least one polyhydric alcohol $R'(OH)_m$, wherein R' is an 1-valent or, respectively, an m-valent $C_1-C_{20}$ hydrocarbyl group and m is an integer selected from 2, 3, 4, 5 and 6, to give a first intermediate (ab), and
  (ii) reacting said first intermediate (ab) with at least one dicarboxylic acid dihalide (c) which forms essentially all of the dicarboxylic acid di-, oligo- and/or polyester and has the formula (1):

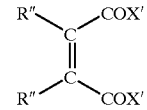

(1)

wherein each R" is a similar or different $C_1-C_{20}$ hydrocarbyl group or both R":s form together with the two unsaturated carbons of the formula a $C_5-C_{20}$ aliphatic or aromatic ring, and X' is a halogen, to give a second intermediate (abc), and
  (iii) reacting said second intermediate (abc) with at least one titanium tetrahalide $TiX''_4$ (d) wherein X" is a halogen, or
  (ii') reacting said first intermediate (ab) with at least one titanium tetrahalide $TiX''_4$ (d) wherein X" is a halogen, to give an alternative second intermediate (abd), and
  (iii') reacting said alternative second intermediate (abd) with at least one dicarboxylic acid dihalide (c) which forms essentially all of the dicarboxylic acid di-, oligo- and/or polyester and has the formula (1):

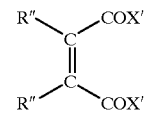

(1)

wherein each R" is a similar or different $C_1-C_{20}$ hydrocarbyl group or both R":s form together with the two unsaturated carbons of the formula a $C_5-C_{20}$ aliphatic or aromatic ring, and X' is a halogen,
  (iv) recovering by precipitation said catalyst component in crude form, or a precursor of said catalyst component, and (v) optionally washing said crude catalyst component or said precursor, to give said catalyst component, (B) feeding to at least one polymerization reactor said catalyst component, as well as a cocatalyst, which has the formula (4)

$$R_pAl_rX_{3r-p} \quad (4)$$

wherein R is a $C_1$–$C_{10}$ alkyl, preferably a $C_1$–$C_4$ alkyl, most preferably ethyl, X is a halogen, preferably chlorine, p is an integer from 1 to (3r–1), preferably 2 or 3, most preferably 3, and r is 1 or 2, preferably 1, the molar ratio between said catalyst component and said cocatalyst, expressed as Al/Ti, preferably being 10–2000, more preferably 50–1000, most preferably 200–500, optionally an external electron donor, which preferably is a silane, more preferably a $C_1$–$C_{12}$ alkyl-$C_1$–$C_{12}$ alkoxy silane, most preferably cyclohexyl methyl dimethoxy silane, optionally a $C_4$–$C_{10}$ hydrocarbon solvent, preferably pentane, hexane and/or heptane, preferably a chain transfer agent, which is hydrogen, and at least one olefin monomer, which preferably is propylene, (C) carrying out the polymerization of said olefin monomer in said at least one polymerization reactor to give an olefin polymer (=homopolymer or copolymer) and (D) recovering said olefin polymer.

In the claimed olefin polymerization process, the used (transition metal) catalyst component can be prepared according to any above described embodiment of the catalyst component preparation process.

According to one further embodiment of the invention, olefins are polymerized by the steps of (A) providing a solid olefin polymerization catalyst component which is essentially homogenous and comprises a magnesium dihalide, a titanium tetrahalide, and a dicarboxylic acid di-, oligo- and/or polyester as internal electron donor ED in the following ratio (3):

$$(MgX_2)_{8-10}(TiX''_4)_1(ED)_{0.7-1.3} \quad (3)$$

wherein $MgX_2$ is said magnesium dihalide, $TiX''_4$ is said titanium tetrahalide, X and/or X'' is preferably Cl, and ED is said dicarboxylic acid di-, oligo- and/or polyester as internal donor, preferably a phthalic acid di-, oligo- or polyester, (B) feeding to at least one polymerization reactor said catalyst component, as well as a cocatalyst which has the formula (4)

$$R_pAl_rX_{3r-p} \quad (4)$$

wherein R is is a $C_1$–$C_{10}$ alkyl, preferably a $C_1$–$C_4$ alkyl, most preferably ethyl, X is a halogen, preferably chlorine, p is an integer from 1 to (3r–1), preferably 2 or 3, most preferably 3, and r is 1 or 2, preferably 1, the molar ratio between said catalyst component and said cocatalyst, expressed as Al/Ti, preferably being 10–2000, more preferably 50–1000, most preferably 200–500, optionally an external electron donor, which preferably is a silane, more preferably a $C_1$–$C_{12}$ alkyl-$C_1$–$C_{12}$ alkoxy silane, most preferably cyclohexyl methyl dimethoxy silane, optionally a $C_4$–$C_{10}$ hydrocarbon solvent, preferably pentane, hexane and/or heptane, preferably a chain transfer agent, which is hydrogen, and at least one olefin monomer, which preferably is propylene, (C) carrying out the polymerization of said olefin monomer in said at least one polymerization reactor to give an olefin polymer (=homopolymer or copolymer) and (D) recovering said olefin polymer.

The invention is described below by means of examples, the purpose of which merely is to illustrate the invention.

EXAMPLES

The following figures illustrate the examples:

Figure 4:
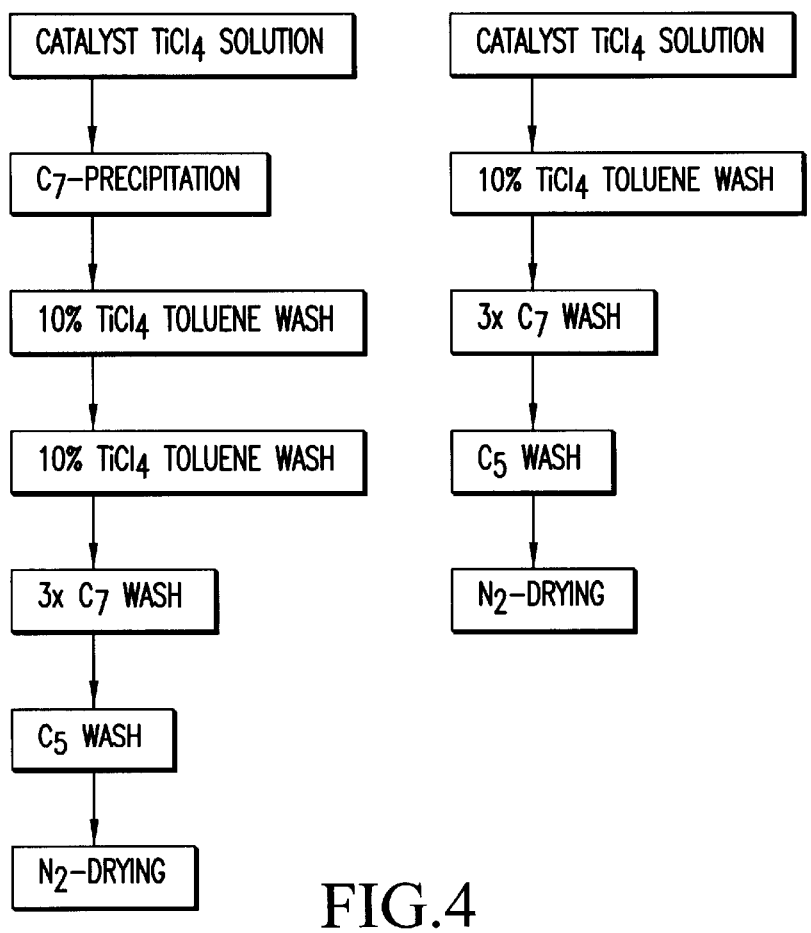

FIG. 4 shows a simplification of the washing procedure in the examples when going from example 6 to examples 7, 8 and 9.

Figure 5:
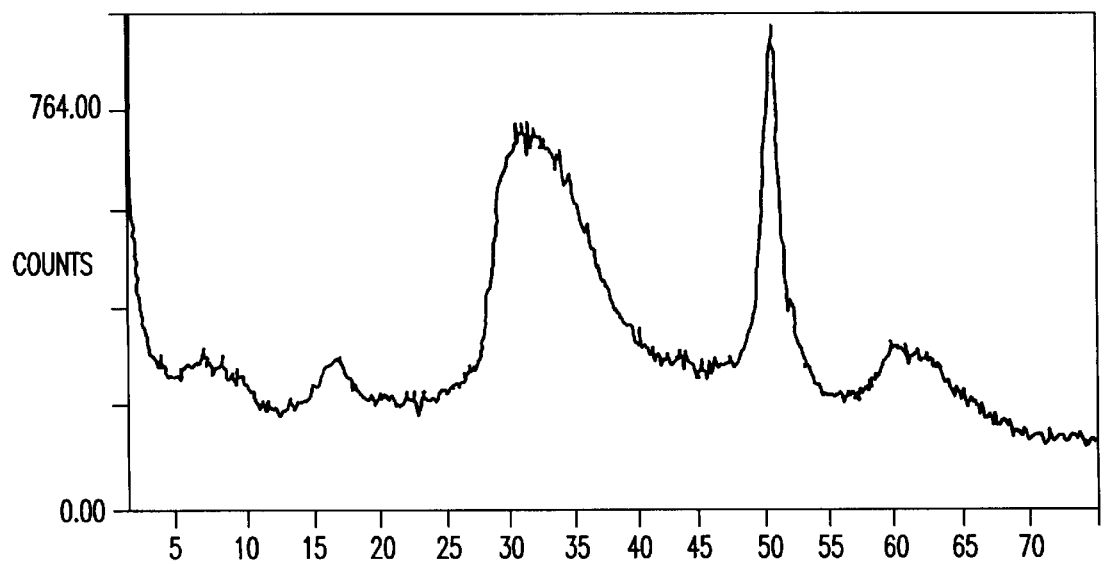

FIG. 5 shows the X-ray diffraction pattern of the catalyst of example 7.

Figure 6:
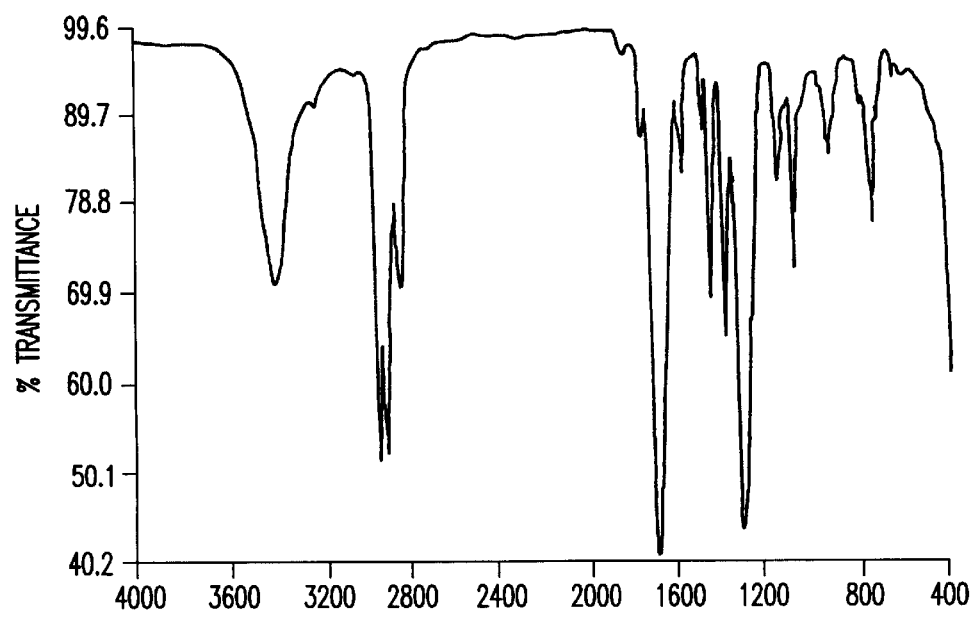

FIG. 6 shows the IR spectrum of the catalyst prepared in example 6.

Figure 7:
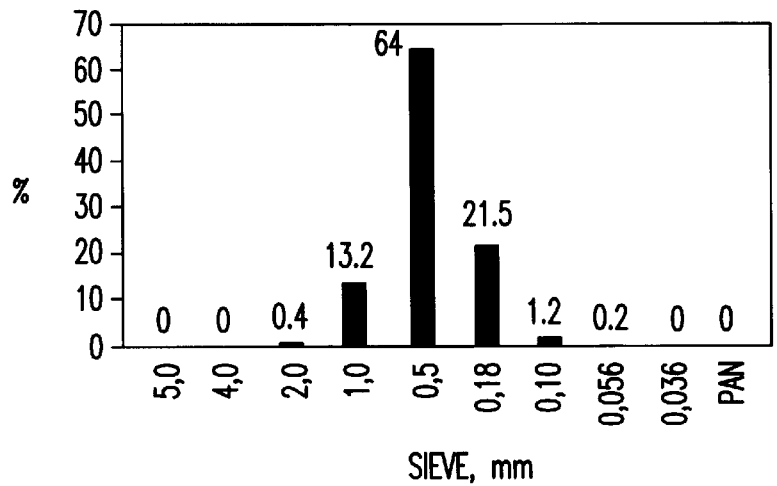

FIG. 7 shows the particle size distribution (PSD) of a propene polymer that was obtained when using the catalyst of example 7 in a test polymerization.

Figure 8:
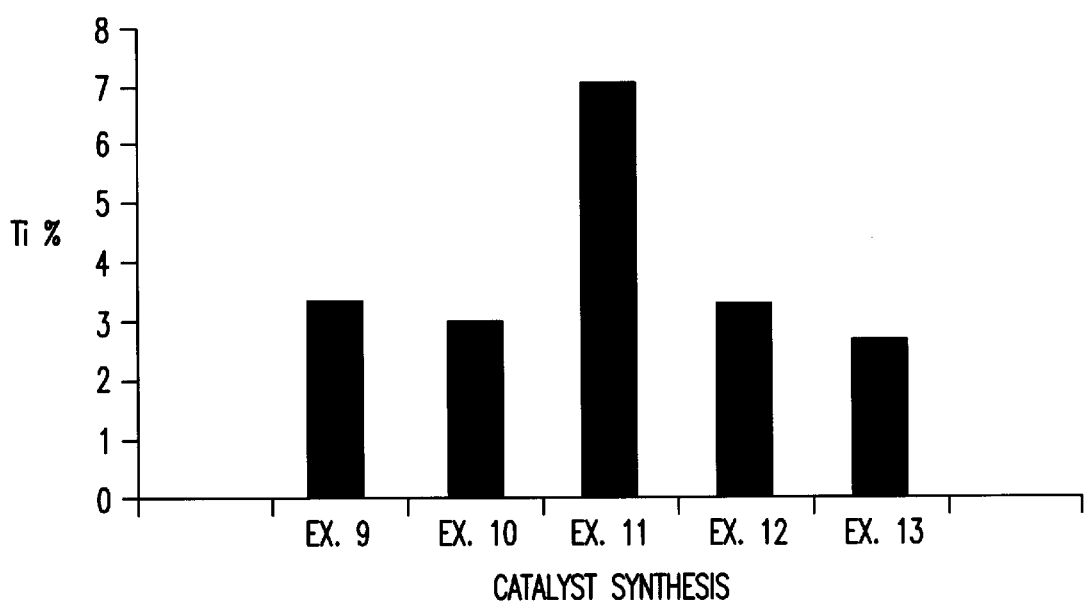

FIG. 8 shows the Ti % in some catalyst according to the invention.

Figure 9:
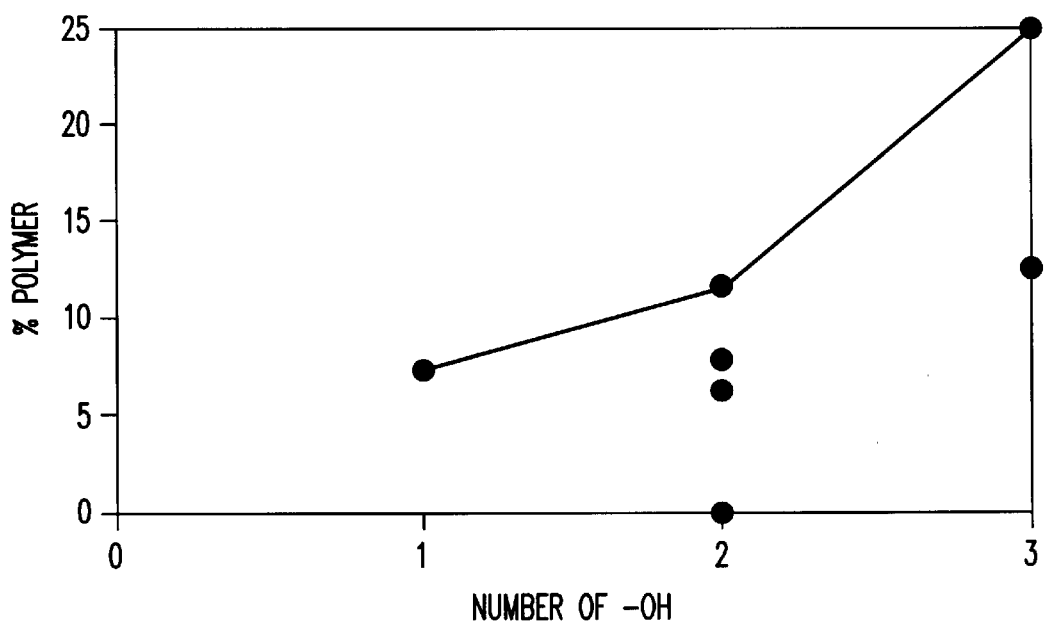

FIG. 9 shows the percent of polymer (=di, oligo or polyester), calculated as 100%–% known species, correlated to the number of —OH groups in the added alcohol.

Figure 10:
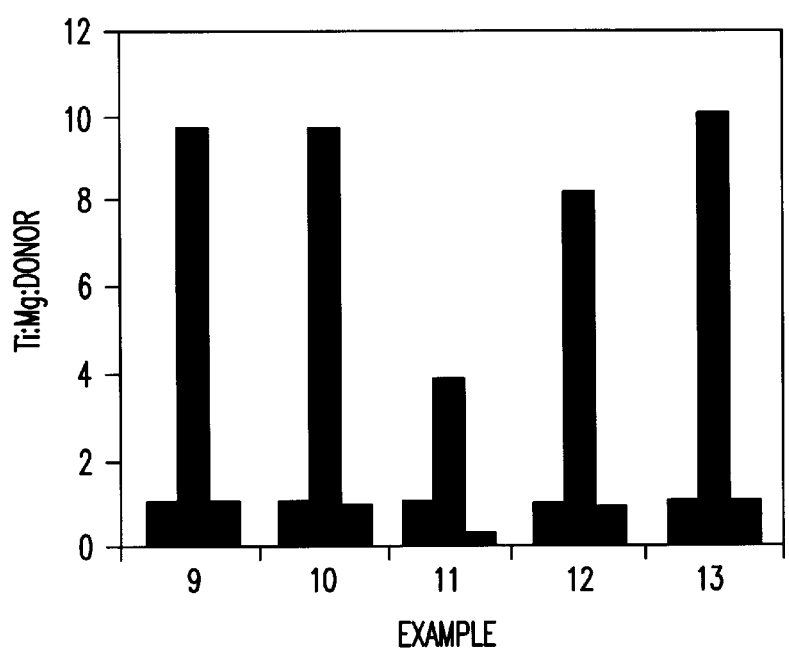

FIG. 10 shows the molar proportions of Ti:Mg:Donor in the catalysts.

Figure 11:
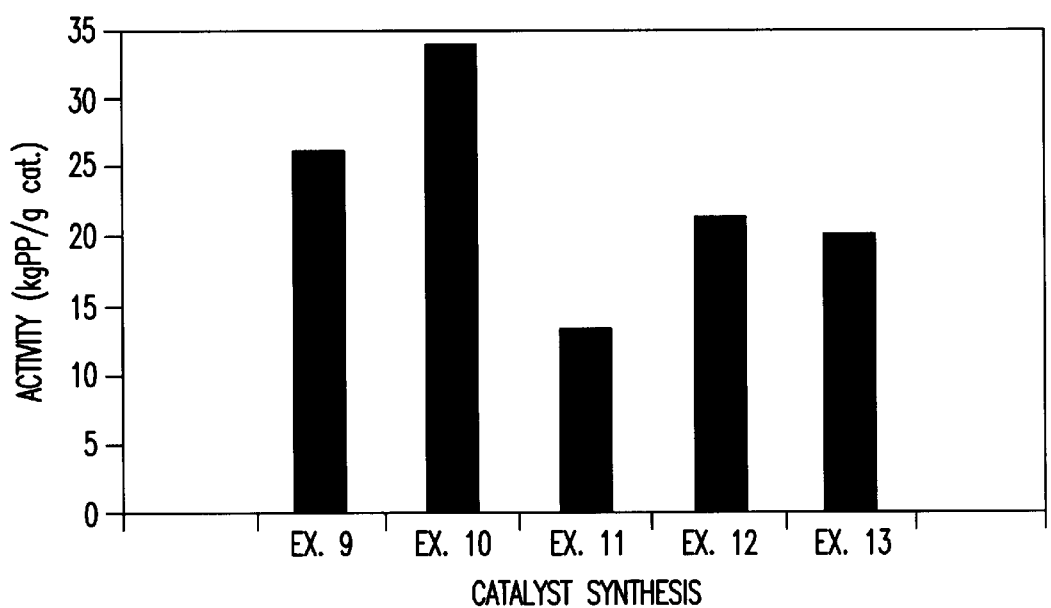

FIG. 11 shows the activity in bulk polymerization of the catalysts in kg PP/g cat units.

Figure 12A:
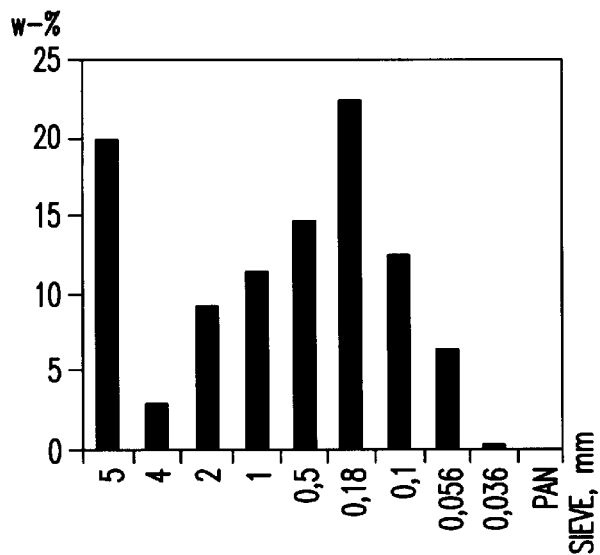

FIG. 12a shows the particle size distribution (PSD) setup for the polymer obtained with the catalyst of example 9.

Figure 12B:
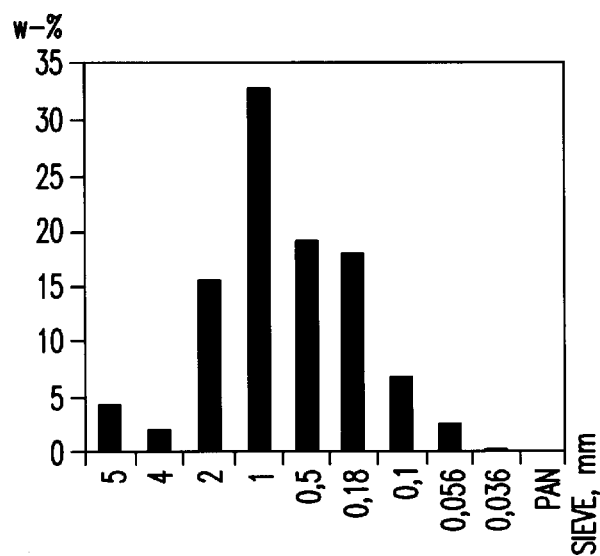

FIG. 12b shows the particle size distribution (PSD) setup for the polymer obtained with the catalyst of example 10.

Figure 12C:
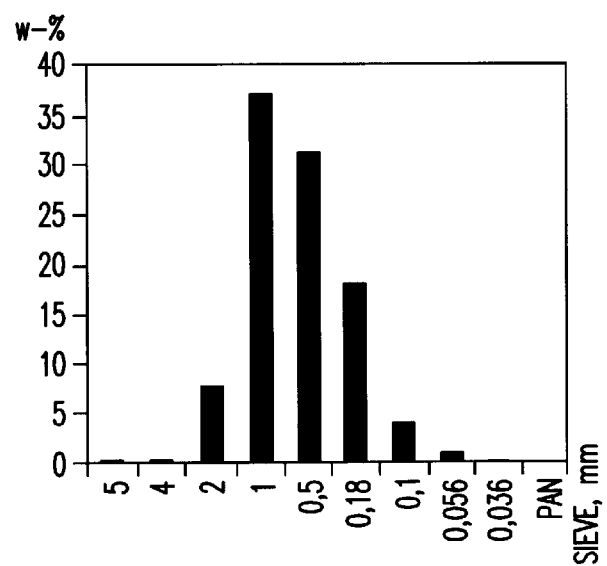

FIG. 12c shows the particle size distribution (PSD) setup for the polymer obtained with the catalyst of example 11.

Figure 12D:
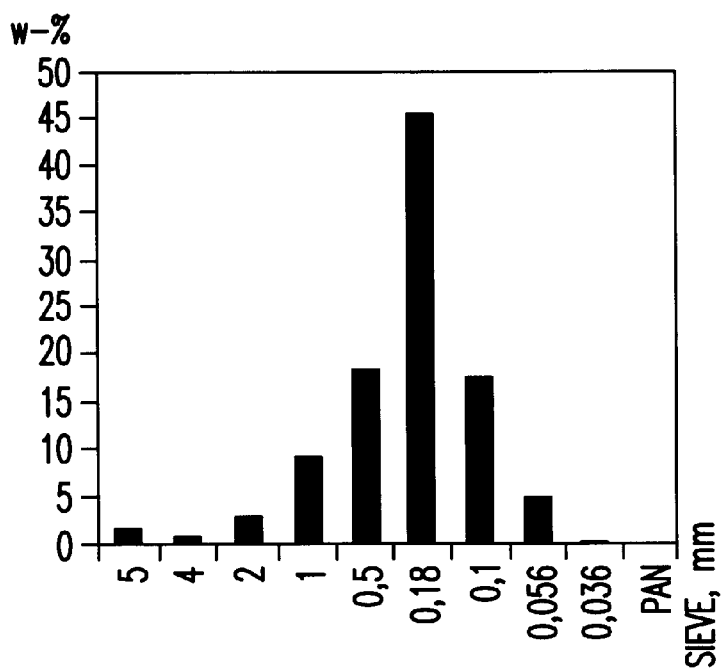

FIG. 12d shows the particle size distribution (PSD) setup for the polymer obtained with the catalyst of example 12.

Figure 12E:
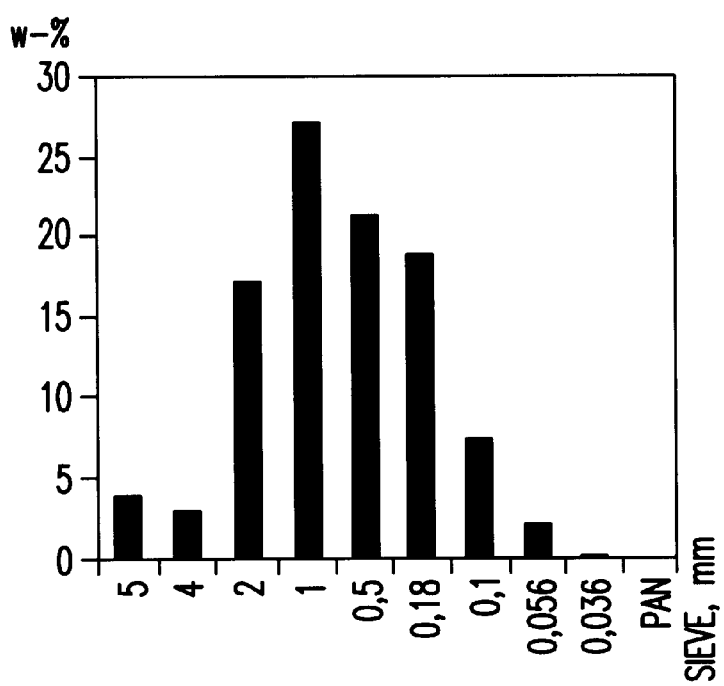

FIG. 12e shows the particle size distribution (PSD) setup for the polymer obtained with the catalyst of example 13.

Figure 13:
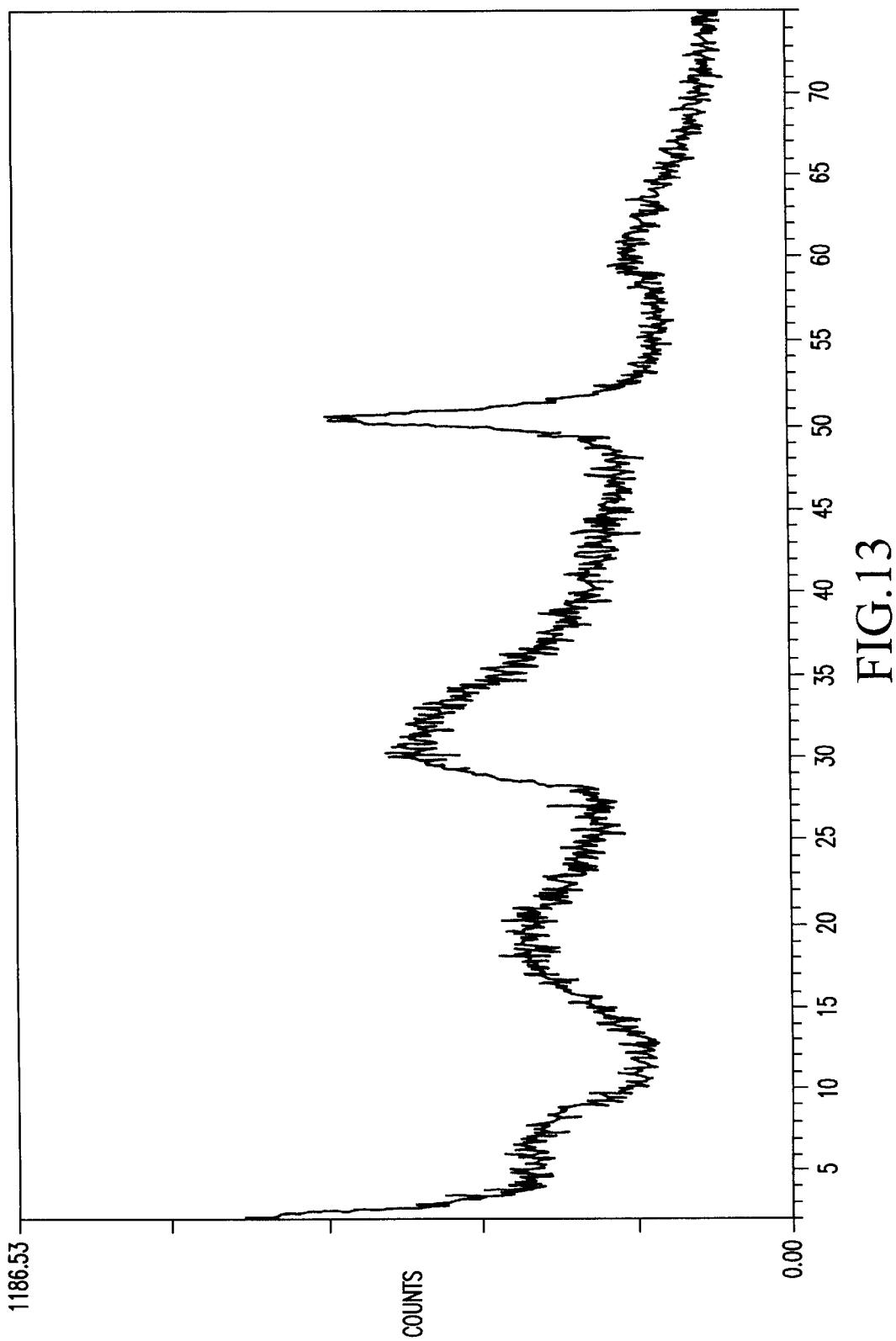

FIG. 13 shows an X-ray diffraction pattern of a catalyst according to the invention.

The following chemicals, chemical characterization of the catalyst components, bulk polymerisation conditions and characterization of the polymers were used in all examples.

Chemicals Used in the Examples

The magnesium alkyl ($MgR_2$) used was BOMAG-A® from Schering which was a 20% heptane solution of butyloctylmagnesium $(n-C_4H_9)_{1.5}(n-C_8H_{17})_{0.5}Mg$ with a magnesium content of 2.92% and a density of $\zeta$=0.729 g/ml. Dry 2-ethyl-1-hexanol (EHA) (>99%) was used as a monohydric alcohol. 2-butyl-2-ethyl-1,3-propanediol (BEPD) was used as a first dihydric alcohol (99%). Ethylene glycol (EG) was used as a second dihydric alcohol. Glycerol (GLY) was used as a trihydric alcohol. 1,2-phthaloyldichloride (PDC) (>95%) was dried and used as chlorination agent. 1-chlorobutane (butylchloride) (BuCl) was dried and used as a reactive reactive halogenated hydrocarbon. Titanium tetrachloride was used as such as a titanation agent (TiCl$_4$). Further, toluene, heptane (C$_7$), pentane (C$_5$), nitrogen gas (N$_2$) and silicon oil 200/5 were used.

A 100% solution of triethylaluminium (TEA) was used as cocatalysts in the bulk polymerizations. Cyclohexyl methyl dimethoxy silane (CMDS) was used as external donor in the polymerizations.

Chemical Characterization of the Catalyst Components

The catalyst components were characterized with respect to their chemical composition by measuring their Mg, Ti and Cl content. The Mg and Ti analysis was started by dissolving the samples in a mixture of nitric and hydrofluoric acid. The metal was measured by flame atomic absorption with a nitrous oxide/acetylene flame. Chloride was determined after dissolution in diluted sulphuric acid by potentiometric titration with a standard silver nitrate solution.

The determination of the phthalic esters (diethylphtnalate DEP and dioctylphtnalate DOP) and the phthalic anhydride (PA) were done by first dissolving the sample in acetone. The samples were filtered and run by solution chromatography (HPLC). Each component was identified by comparing the respective retention time and ultra violet (UV) spectra with standard components.

To check the conversion rate of the ethanol (EtOH), 2-ethyl-hexanol (EHA), or other alcohol added in the synthesis, the alcohol content of the catalysts were measured by gas chromatography (GC). A Hewlett Packard 5890 GC with a 60 m DB-1 column was used for the GC analyses. The column had an diameter of 0.25 mm with a film thickness of 1 $\mu$m. An FID detector was used.

The WAXS X-ray diffraction patterns were collected in reflection mode between 2 and 70° 2 Θ with a Siemens D500 instrument. The CuK$_\alpha$ radiation wavelength was 1.54 Å.

The IR spectra were taken by a Nicolet 510 FTIR equipment with 2 cm$^{-1}$ resolution.

Bulk Polymerization of Propene

Propene was polymerized in a stirred tank reactor having a volume of 5 l. TEA as a cocatalyst, CMDS as an external donor and 30 ml of n-pentane were mixed and allowed to react for 5 minutes. Half of the mixture was added to the polymerization reactor and the other half was mixed with said catalyst component. After additional 5 minutes the catalyst/TEA/CMDS/n-pentane mixture was introduced into the reactor. The Al/Ti mole ratio was 250 and the Al/CMDS mol ratio was 10 mol/mol. 70 mmol hydrogen and 1400 g of propene were introduced into the reactor and the temperature was raised within 15–30 minutes to 70° C. The polymerization time was 60 minutes.

Characterization of the Polymers

The polymers were characterized with respect to their melt flow rate (MFR$_2$), bulk density (BD) and the fraction of total solubles in xylene (XS). The MFR (g/10 min) was measured by using the standard ISO 1133 (2.16 kg load, 230° C.). The bulk density (in kg/m$^3$) of the material was measured from a 100 ml cylinder. The amount of total xylene solubles (in wt-%) was measured by dissolving a polymer sample in 250 ml of boiling xylene, precipitating the isotactic material at 25° C. and evaporating the solvent from the soluble sample fraction.

Examples 1 to 4

The setup of the examples is listed in Table 1.

TABLE 1

The experimental setup for examples 1–4

| Example | MgR$_2$/ROH | Diol | BuCl | Mg/Ti | Mg/PDC |
|---|---|---|---|---|---|
| 1 | 1:2 | No | No | 1:10 | 1:1 |
| 2 | 1:2 | Yes | Yes | 1:10 | 1:0.5 |
| 3 | 1:3 | No | Yes | 1:2 | 1:0.5 |
| 4 | 1:3 | Yes | Yes | 1:10 | 1:0.5 |

In comparative example 1, no butyl chloride was used. In comparative examples 1 and 3, no diol was used. The synthesis was started by introducing 35 mmol of MgR$_2$ (BOMAG-A®) into a 100 ml glass reactor at room temperature. The molar ratio MgR$_2$/C$_7$ in this solution was 1:7.

In the next step EHA was added in a molar ratio MgR$_2$/EHA of 1:2 or 1:3 depending on the experimental setup. After the addition of EHA, the temperature was increased to 60° C. and the reactants were allowed to react with each other for 30 min. After this the reaction solution was cooled down to room temperature. Depending of the experimental setup, the second alcohol, i.e. the BEPD was introduced into the reactor. The MgR$_2$/BEPD molar ratio was 1:0.5. Again, the temperature was increased to 60° C. and the reactants were allowed to react with each other at this temperature for 30 min after which the temperature was lowered to room temperature.

The next reagent to be added was the ortho-phthaloyl dichloride (PDC). This chlorination agent was added in a Mg/PDC molar ratio of 1:1 or 1:0.5 according to Table 1. The temperature was increased to 60° C. and the reaction solution was kept at this temperature for 30 min. After this the temperature of the reaction solution was lowered to room temperature. Depending on the experimental setup the second chlorination agent, butylchloride (BuCl) was now added at a Mg/BuCl molar ratio of 1:1. Again the temperature was increased to 60° C. and the reaction solution was kept at this temperature for 30 min.

In example 2 and comparative example 3 silicon oil was added as particle size modifier. It was introduced directly onto the hot solution. The molar ratio of the added silicon oil to magnesium was 5:1, calculated as mol silice per mol magnesium (Si/Mg).

A portion of toluene was added either to the hot Mg solution (comparative example 1 and example 4) or to the receiving TiCl$_4$ solution (example 2 and comparative example 3) to increase the solubility of the components. The C$_6$H$_5$CH$_3$/Mg molar ratio was 5:1.

While the Mg-solution was being prepared, a portion of TiCl$_4$ was introduced into a 250 ml thermostated glass reactor. The TiCl$_4$/Mg molar ratio was 2:1 or 10:1. A portion of TiCl$_3$OEt was added to the TiCl$_4$ solution in comparative examples 1 and 3 and in example 2. The TiCl$_3$OEt/Mg molar ratio was 3:1. The temperature of this receiving solution was increased to 110° C.

The Mg-solution was then added dropwise to this hot TiCl$_4$ solution. The whole addition took 20 min. After this the reactants were allowed to react with each other for 5 min (examples 2 and 4) or 1 h (comparative examples 1 and 3).

After the components had reacted with each other, the reaction solution was allowed to cool down to 90° C., after which 40 mol heptane (C$_7$) was added to precipitate the catalyst complex. After this the supernatant liquid was siphoned off.

The catalyst component was washed with toluene or a mixture of toluene and TiCl$_4$. The toluene wash was carried out at 90° C. for 20 min, under stirring. Then the catalyst component was washed two times at 90° C. for 10 min with heptane. The C$_7$/Mg molar ratio in these washes was 40:1. Thereafter, the catalyst component was washed with pentane (C$_5$) for 10 min at room temperature. The C$_5$/Mg molar ratio was 50:1. Finally, the catalyst component was dried under a stream of nitrogen. All the catalyst were characterized chemically according to the description above and they were test polymerized as described above. All the results are listed in Table 2, in which EtOH stands for ethanol.

TABLE 2

| Catalyst | Comparative example 1 | Example 2 | Comparative example 3 | Example 4 |
|---|---|---|---|---|
| Mg (wt-%) | 8.0 | 14.1 | 16.4 | 11.9 |
| Mg (mol/100 g catalyst) | 0.33 | 0.58 | 0.68 | 0.49 |
| Ti (wt-%) | 5.8 | 1.8 | 2.5 | 3.1 |
| Ti (mol/100 g catalyst) | 0.12 | 0.04 | 0.05 | 0.07 |
| BEPD (wt-%) | | 0.27 | | 0.48 |
| BEPD (mol/100 g catalyst) | | 0.002 | | 0.003 |
| EHA (wt-%) | | 0.21 | 0.001 | 0.13 |
| EHA (mol/100 g catalyst) | | 0.002 | 0.001 | 0.001 |
| EtOH (wt-%) | | 0.76 | 0.27 | |
| DEP (wt-%) | 8.54 | 1.42 | 1.27 | |
| DEP (mol/100 g catalyst) | 0.038 | 0.006 | 0.006 | |
| DOP (wt-%) | 28.4 | 16.8 | 11.1 | 33.6 |
| DOP (mol/100 g catalyst) | 0.073 | 0.043 | 0.028 | 0.086 |
| PA (wt-%) | 1.46 | 0.09 | | 0.9 |
| Mg (molar ratio) | 2.7 | 15.4 | 12.9 | 7.6 |
| Ti (molar ratio) | 1 | 1 | 1 | 1 |
| Donor (molar ratio) | 0.9 | 1.3 | 0.7 | 1.3 |
| Toluene (wt-%) | | 0.71 | 0.22 | 0.07 |
| C5 (wt-%) | | 1.02 | 0.46 | 0.37 |
| C7 (wt-%) | | 2.15 | 1.18 | 0.70 |
| Activ. (kg PP/g cat) | 4.8 | 7.00 | 10.6 | 26.1 |
| Activ. (kg PP/g Ti) | 83 | 389 | 424 | 842 |
| BD (kg/m$^3$) | 400 | 350 | 450 | 470 |
| MFR$_2$ (g/10 mm) | 10.3 | 8.3 | 10.4 | 6.7 |
| XS (wt-%) | 2.4 | 1.7 | 1.6 | 1.8 |

The results of the catalyst synthesis show that:

1. BuCl greatly effects the Mg/Ti molar ratio.
2. There is an oligo- or polyester formation if a diol and a phthaloyl dichloride is used in the synthesis of the donor compound.
3. The presence of DOP in the precipitating (MgCl$_2$)$_x$TiCl$_4$DOP complex favours the outcome of regular amorphous crystal structure of the complex MgCl$_2$.
4. Ethers are present in the (MgCl$_2$)$_x$TiCl$_4$DOP catalyst complex.
5. BuCl greatly improves the catalyst activity.
6. Optimum composition of the catalyst complex is (MgCl$_2$)$_x$TiCl$_4$DOP, wherein X is from about 7 to about 10.
7. Activities of up to 27 kg PP/g cat are reached.

Figure 1:
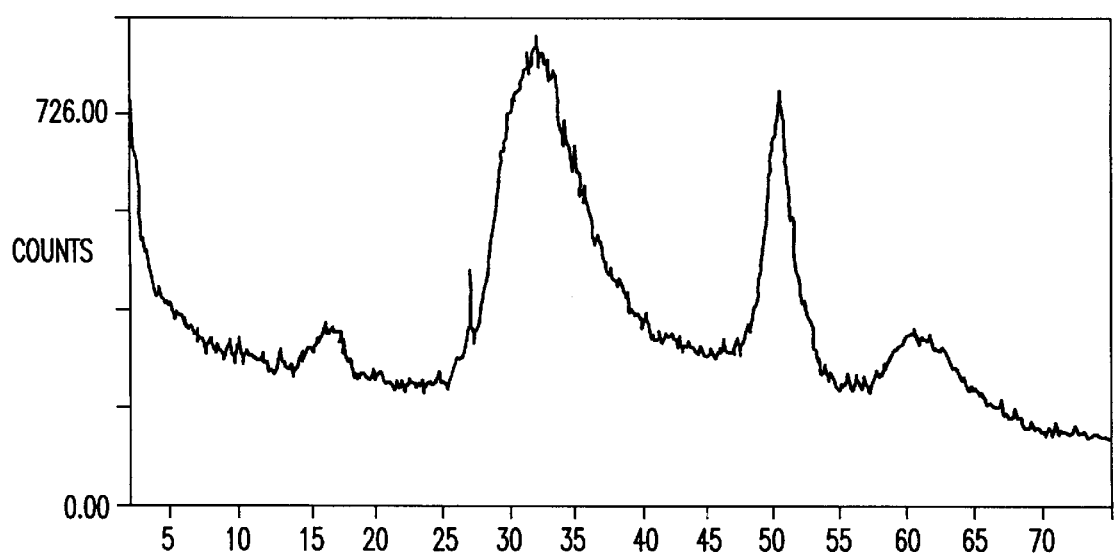
FIG. 1 shows an example of a regular amorphous $MgCl_2$ X-ray diffraction pattern of a polymer prepared by using a catalyst according to the invention.

Most of the catalysts originating from a synthesis where PDC had been used showed a quite regular amorphous MgCl$_2$ X-ray diffraction pattern. As an example of these patterns the pattern of example 2 is shown in FIG. 1. The 2 Θ-value is given in abscisse. Only one of the catalysts belonging to this latter group showed a strongly disturbed X-ray pattern, while the rest of them followed nicely the above mentioned features. However one pattern (in FIG. 13) showed an unusual halo between 18° and 22° 2 Θ reflecting the haloformation significant for MgCl$_2$(Mg(OR)$_2$)$_2$ complexes.

Figure 2:
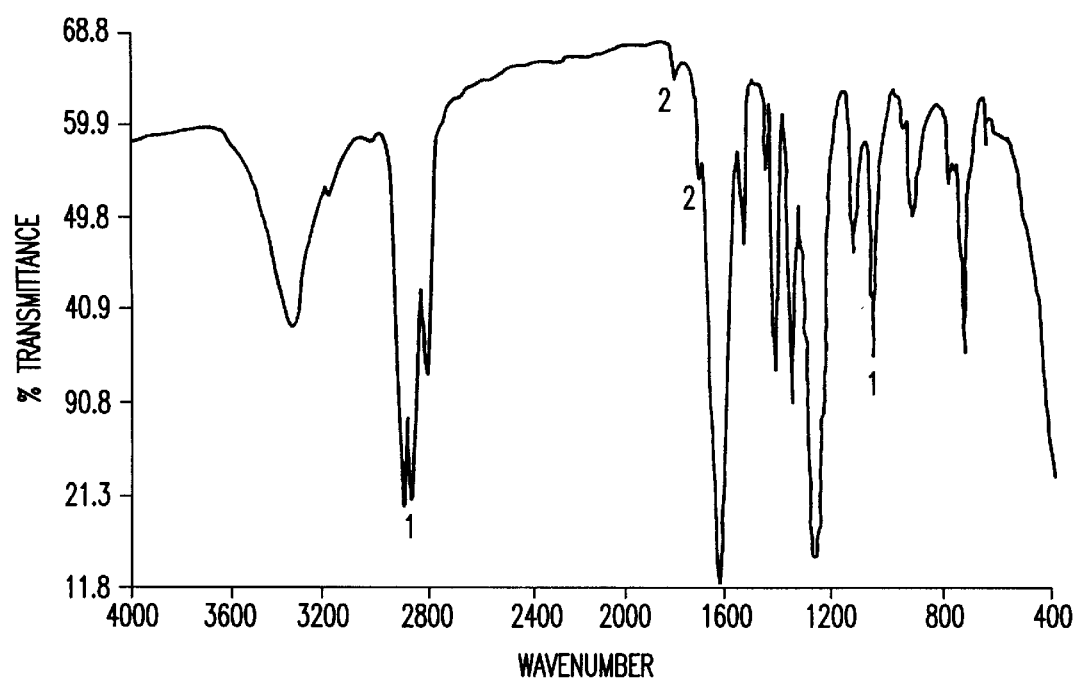
FIG. 2 shows the IR spectrum of a catalyst.

In all the IR spectra from the catalysts prepared out of PDC there were clear peaks indicating the presence of ether at 1080 cm$^{-1}$. In all these spectra there were also clear peaks at 1860 and 1760 cm$^{-1}$ indicating the presence of an acid anhydride. An example of these spectra is shown in FIG. 2 where the IR spectrum of the catalyst component of example 4 is shown. The wavenumber is shown in abscisse and the % of transmittance in ordinate. (1) peak indicates ether and (2) peak indicates acid anhydride.

Figure 3:
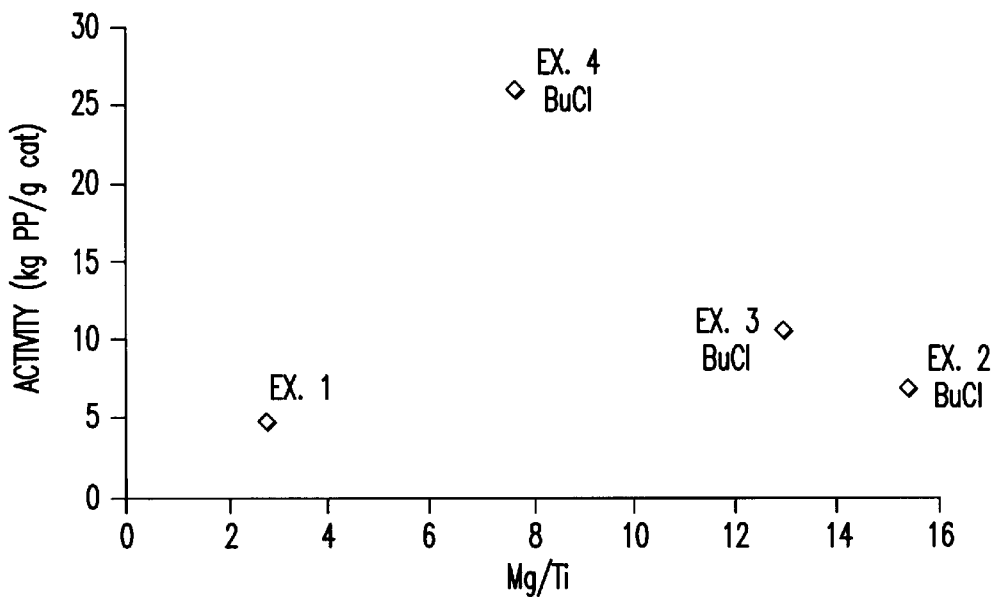
FIG. 3 shows the activity of the PDC catalysts as a function of their Mg/Ti molar ratio.

It is believed that BuCl reduces the TiCl$_4$ content relative to the MgCl$_2$ content of the catalyst component. This can be seen in FIG. 3 where the activities of the PDC catalysts are shown as a function of their Mg/Ti molar ratio. Here it can be seen that the three catalysts that has been chlorinated by BuCl are forming an own group in the right upper corner of the figure, while the catalysts that have not been contacted with BuCl are forming a group in the lower left corner of the figure. The graph indicates that there is an optimum activity corresponding to an Mg/Ti molar ratio of 7–10. This finding is supported by an another result from comparative examples 1 and 3 and examples 2 and 4 indicating that a moderate washing of the catalyst is optimum.

Examples 5 to 8

The experimental setups for examples 5–8 are listed in Tables 3–6. Example 4b was done for comparison. The chemicals used were identical to those used in examples 1–4, as well as the characterisation methods. The catalysts were polymerized according to the polymerization process described above.

In example 5 the amount of BuCl is increased to the double compared to example 4b. Example 6 was identical to example 5, but no heptane was added to the TiCl$_4$ solution. The principle of the catalyst washing in example 6 is shown in FIG. 4, left column.

Example 7 was identical to example 6, but a larger part of the monoalcohol was replaced by the diol. Example 8 was a repetition of the third (example 7) with the exception that the mono and dihydric alcohols were mixed together and added to the catalyst synthesis in a joined addition step. The principle of the catalyst washing in examples 7–9 is shown in FIG. 4, right column.

Preparation of the Catalyst Components

In the following, example 6 is described. The other examples were performed in a similar way. Into a 250 ml glass reactor was introduced 40 ml of a 20% heptane solution of BOMAG-A® (35.01 mmol). Onto this was added 11.0 ml (70.01 mmol) of EHA. The temperature of the reaction solution was increased to 60° C. and the reactants were allowed to react with each other for 30 min. Then, 2.805 g (17.50 mmol) of BEPD was first heated with 2 ml of heptane in a septum bottle to 40° C. to obtain a feed solution. This solution was siphoned to the main reactor. To secure complete transfer, the septum bottle was rinsed with another portion of 1.5 ml of heptane that was also siphoned to the main reactor. Again the reactants were allowed to react for 30 min. 2.52 ml (17.50 mmol) of PDC was introduced and allowed to react for 30 min. The last reagent when preparing the Mg complex solution was 4.000 ml (76.570 mmol) of BuCl that also was allowed to react for 30 min. 20 ml (187.8 mmol) of toluene was added as last step in the preparation of the Mg complex solution in order to decrease its viscosity.

The following step in the catalyst synthesis was the addition of the Mg complex into 38.48 ml (350.1 mmol) of $TiCl_4$. The addition was done dropwise, the $TiCl_4$ solution having a temperature of 110° C. The catalyst was allowed to be formed in this solution for 5 min after which the $TiCl_4$ solution was allowed to cool down to 90° C. after which 110 ml of heptane was added (in examples 5 and 6) to improve the precipitation of the catalyst. The reaction solution was kept at 90° C. for 20 min after which the catalyst was allowed to settle and the liquid was siphoned off. After this, the catalyst was washed twice with a 130 ml portion of a 10% $TiCl_4$ toluene solution at 90° C. for 30 min. Finally the catalyst was washed twice with 180 ml portions of heptane also at 90° C. for 30 min and lastly with a 150 ml portion of pentane at room temperature for 15 min. The catalyst was dried from hydrocarbons under a stream of nitrogen.

In Tables 3–6, mol.ratio stands for molar ratio, stirr. stands for stirring time in minutes, settl. stands for settling time in minutes and 22→60 means that the temperature was risen from 20 to 60° C. No stirring was used during the drying.

TABLE 3

| Example 5 | mol. ratio | mmol | ml | ° C. |
|---|---|---|---|---|
| BOMAG-A ® (20%/C7) | 1 | 35.01 | 40.0 | |
| EHA | 2 | 70.01 | 11.0 | |
| BEPD | 0.5 | 17.50 | | |
| PDC | 0.5 | 17.50 | 2.5 | |
| BuCl | 2.2 | 76.57 | 8.0 | |
| Toluene | | | 20.0 | |
| $TiCl_4$ (110° C.) | 10 | 350.1 | 38.5 | |
| Principation in C7 | 20 | 5 | | 90° |
| Washings: | stirr. (min) | settl. (min) | ml | C. |
| Toluene (+10% $TiCl_4$) | 30 | 5 | | |
| C7 | 26 | 2 | | 90 |
| C7 | 28 | 2 | | 90 |
| C5 | 19 | 2 | | 22 |
| Drying ($N_2$) 46 min | | | | 22→60 |

TABLE 4

| Example 6 | mol. ratio | mmol | ml |
|---|---|---|---|
| BOMAG-A ® (20%/C7) | 1 | 35.01 | 40.0 |
| EHA | 2 | 70.01 | 11.0 |
| BEPD | 0.5 | 17.50 | |
| PDC | 0.5 | 17.50 | 2.5 |
| BuCl | 2.2 | 76.57 | 8.0 |
| Toluene | | | 20.0 |
| $TiCl_4$ (110° C.) | 10 | 350.1 | 38.5 |
| Washings: | stirr. (min) | settl. (min) | ml | ° C. |
| Toluene (+10% $TiCl_4$) | 30 | 4 | | 90 |
| C7 | 36 | 3 | | 90 |
| C7 | 32 | 6 | | 90 |
| C5 | 30 | 2 | | 22 |
| Drying ($N_2$) 45 min | | | | 22→60 |

TABLE 5

| Example 7 | mol. ratio | mmol | ml |
|---|---|---|---|
| BOMAG-A ® (20%/C7) | 1 | 35.01 | 40.0 |
| EHA | 1.5 | 52.51 | 8.3 |
| BEPD | 0.75 | 26.25 | |
| PDC | 0.4 | 14.00 | 2.0 |
| BuCl | 2.2 | 76.57 | 8.0 |
| Toluene | | | 20.0 |
| $TiCl_4$ (110° C.) | 10 | 350.1 | 38.5 |
| Washings: | stiff. (min) | settl. (min) | ml | ° C. |
| Toluene (+10% $TiCl_4$) | 36 | 5 | 130 | 90 |
| C7 | 30 | 3 | 150 | 90 |
| C7 | 30 | 3 | 145 | 90 |
| C5 | 30 | 3 | 150 | 22 |
| Drying ($N_2$) 45 min | | | | 22→60 |

TABLE 6

| Example 8 | mol. ratio | mmol | ml |
|---|---|---|---|
| BOMAG-A ® (20%/C7) | 1 | 35.01 | 40.0 |
| EHA | 1.5 | 52.51 | 8.3 |
| BEPD | 0.75 | 26.25 | |
| PDC | 0.4 | 14.00 | 2.0 |
| BuCl | 2.2 | 76.57 | 8.0 |
| Toluene | | | 20.0 |
| $TiCl_4$ (110° C.) | 10 | 350.1 | 38.48 |
| Washings: | stiff. (min) | settl. (min) | ml | ° C. |
| Tol. (+10% $TiCl_4$) | 44 | | 140 | 90 |
| C7 | 25 | 27 | 150 | 90 |
| C7 | 30 | 7 | 150 | 90 |
| C5 | 30 | 9 | 155 | 22 |
| Drying ($N_2$) 37 min | | | | 22→60 |

The catalysts and the polymers obtained were analyzed and characterized as described above for examples 1–4. The results are listed in Table 7.

TABLE 7

| Catalyst | Example 4b | Example 5 | Example 6 | Example 7 | Example 8 |
|---|---|---|---|---|---|
| Mg (wt-%) | 11.5 | 8.8 | 13.4 | 13.4 | 12.6 |
| Mg (mol/100 g catalyst) | 0.473 | 0.362 | 0.551 | 0.551 | 0.519 |
| Ti (wt-%) | 2.9 | 4.5 | 2.1 | 3.2 | 2.4 |
| Ti (mol/100 g catalyst) | 0.061 | 0.094 | 0.044 | 0.067 | 0.050 |
| Cl (wt-%) | 45.8 | 40.4 | 48.5 | 47.3 | 45.3 |
| BEPD (wt-%) | 0.01 | 0.96 | 0.65 | 1.66 | 1.24 |
| BEPD (mol/100 g catalyst) | 0.000 | 0.006 | 0.004 | 0.010 | 0.008 |
| EHA (wt-%) | 0.24 | 0.45 | 0.44 | 0.33 | 0.33 |
| EHA (mol/100 g catalyst) | 0.0018 | 0.0035 | 0.0034 | 0.0025 | 0.0025 |
| DOP (wt-%) | 35.5 | 41.8 | 34.7 | 21.9 | 21.1 |
| DOP (mol/100 g catalyst) | 0.091 | 0.107 | 0.089 | 0.056 | 0.054 |
| PA (wt-%) | 1.0 | 0.8 | 1.7 | 1.2 | 1.0 |
| Mg (mol Mg/mol Ti) | 7.8 | 3.9 | 12.6 | 8.3 | 10.3 |
| Donor (mol Donor/mol Ti) | 1.5 | 1.1 | 2.0 | 0.8 | 1.1 |
| Toluene (wt-%) | 0.09 | 0.17 | 0.04 | 0.32 | 0.37 |
| C5 (wt-%) | 0.6 | 0.17 | 0.06 | 0.39 | 0.45 |
| C7 (wt-%) | 0.15 | 0.40 | 0.15 | 1.90 | 8.73 |
| Volatil. tot. (wt-%) | 0.84 | 0.74 | 0.25 | 2.61 | 9.55 |
| Activ. (kg PP/g cat) | 19.4 | 15.2 | 12.0 | 21.2 | 19.1 |
| Activ. (kg PP/g Ti) | 669 | 339 | 569 | 472 | 795 |
| BD (kg/m$^3$) | 470 | 400 | 290 | 310 | 300 |
| MFR$_2$ (g/10 min) | 6.5 | 7.2 | 10.5 | 8.0 | 8.9 |
| XS (wt-%) | | | 3.2 | 2.3 | 3.1 |

The examples 5 to 8 show that very good morphology of the polymer material can be achieved if the heptane precipitation of the catalyst is left out from the catalyst synthesis. 65% of the polymer particles had a particle size between 0.5 and 1.0 mm. The catalyst yield in the catalyst synthesis was the same even if heptane precipitation was not used.

Increased amount of oligo or polyester ingredients added to the catalyst synthesis increased the amount of organic material in the catalyst from 2 to 10%.

X-ray diffraction patterns were taken from all catalysts. The characteristic features are a quite sharp peak at 50° 2Θ describing the broadness of the crystal plates and, a halo formation between 30° and 35° 2Θ describing the intermediate reflecting layers. There was however, a clear difference. In crystalline MgCl$_2$ there is an intensive peak at 15° 2Θ indicating the lamellar thickness. The position of this peak is the same also for amorphous MgCl$_2$ even if it is much lower. The results showed that there had been a clear shift of the lamellar thickness indicating peak in all the X-ray diffraction patterns coming from the catalysts in this test series. In Table 8 the position of the lamellar thickness indicating peak for the catalysts in this test series is listed. In all cases the peak had shifted upwards to the region of about 17° 2Θ. These results indicate that there is forming a new type of more tightly packed MgCl$_2$ crystals in the lamellar thickness direction in the material formed in the type of stoichiometric preparation route described here (see FIG. 5).

The IR spectrum of the catalyst of example 6 is shown in FIG. 6, and the PSD of the polymer from example 7 is shown in FIG. 7, where sieve size (mm) is given in abscisse and the % of polymer in ordinate.

TABLE 8

The position of the lamellar thickness indicating peak in the X-ray diffraction pattern for crystalline MgCl$_2$, amorphous MgCl$_2$ and for the catalysts of examples 5 to 8

| Material | Position of the lamellar thickness indicating peak |
|---|---|
| Crystalline MgCl$_2$ | 15.0° 2Θ |
| Amorphous MgCl$_2$ | 15.0° 2Θ |
| Example 5 | 17.1° 2Θ |
| Example 6 | 17.0° 2Θ |
| Example 7 | 16.5° 2Θ |
| Example 8 | 16.1° 2Θ |

FIG. 6 shows the IR spectrum for the catalyst of example 6.

The polymerization results are listed in Table 9 together with a description of the polymer morphology.

TABLE 9

The polymers and their bulk denisty

| Example | Bulk density kg/m$^3$ |
|---|---|
| 4b | 470 |
| 6 | 290 |
| 7 | 310 |
| 8 | 300 |

The first polymer (example 4b) showed a broad particle size distribution (PSD). The highest BD (470 kg/m$^3$) was seen in this material. The morphology improved greatly when the heptane addition was left out in the precipitation step. The improvement was seen already when preparing the catalyst, as a catalyst precipitate that had much better settling properties was achieved. The same improvement was then seen in the morphology of the polymer that was produced when using this catalyst in the test polymerization. Over 65% of the material of example 6 has a particle size that is between 0.5 mm and 1.0 mm. The amount of fines (defined as particles below 0.1 mm) is below 1%. The amount of particles having a particle size of over 2 mm is also low, i.e. around 1%.

Examples 9 to 13

The experimental setups for examples 9–13 are listed in Tables 10–14 and the results are listed in Table 15.

Preparation of the Catalysts 40.0 ml (35.01 mmol) of $MgR_2$ was added into a glass reactor. 11.0 ml (70.01 mmol) of EHA was added into the reactor and allowed to react with the $MgR_2$. The reactants were allowed to react with each other for 30 min. After this, 17.50 mmol of the second alcohol component was added according to the description. To ensure full equilibrium, the reactants were allowed to react with each other for 30 min. 2.52 (17.50 mmol) of PDC was added and allowed to react for 30 min. The last component to be added in the Mg complex was BuCl, 4.00 ml (38.28 mmol) of this substance was added and allowed to react for 20 min. All reaction steps were carried out at a temperature of 60° C. Last, the heptane of the $MgR_2$ solution was evaporated away at 107° C. and replaced with 10 ml (94 mmol) of toluene. The formed Mg complex was now added dropwise to 38.48 ml (350.1 mmol) of $TiCl_4$ at 110° C. The components were allowed to react for 5 min after which 100 ml (938 mmol) of toluene was added. The components were allowed to react for 30 min after which mixing was stopped and the catalyst was allowed to settle. Both the settling time and the precipitate volume were recorded. After siphoning off the reaction solution, the catalyst was washed first with a 10 V-% $TiCl_4$ solution of toluene, twice with heptane and last with pentane. The washings were carried out as stated in Table 10. Finally the catalysts were dried under a stream of nitrogen.

TABLE 10

| Example 9 | mol. ratio | mmol | |
|---|---|---|---|
| BOMAG-A ® (20%/C7) | 1 | 35.01 | 40.00 ml |
| EHA | 2 | 70.01 | 11.00 ml |
| BEPD | 0.5 | 17.50 | 2.81 g |
| PDC | 0.5 | 17.50 | 2.52 ml |
| BuCl | 1.1 | 38.285 | 4.00 ml |
| EVAPORATION | | condense | 30.33 g |
| Toluene | | | 5 ml |
| $TiCl_4$ (110° C.) | 10 | 350.1 | 38.48 ml |

| Washings: | stirr. (min) | settl. (min) | ml | ° C. |
|---|---|---|---|---|
| Settling | 0 | 15 | | 90 . . . 70 |
| Toluene | 30 | 30 | 130 | 90 |
| Toluene (+10% $TiCl_4$) | 45 | 970 | 120 | 90 |
| C7 | 35 | 10 | 180 | 90 |
| C7 | 28 | 15 | 170 | 90 |
| C5 | 20 | 1063 | 150 | 22 |
| Drying ($N_2$) 75 min | | | | 22→60 |

TABLE 11

| Example 10 | mol · ratio | mmol | ml/ |
|---|---|---|---|
| BOMAG-A ® (20%/C7) | 1 | 35.01 | 40.00 |
| EHA | 2 | 70.01 | 11.00 |
| EG | 0.5 | 17.50 | 0.98 |
| PDC | 0.5 | 17.50 | 2.52 |
| BuCl | 1.1 | 38.28 | 4.00 |
| EVAPORATION | | | |
| Toluene | | | 5.0 |
| $TiCl_4$ (110° C.) | 10 | 350.1 | 38.48 |

| Washings: | stirr. (min) | settl. (min) | ml | ° C. |
|---|---|---|---|---|
| Toluene | 35 | 10 | 200 | 90 |
| Toluene (+10% $TiCl_4$) | 30 | 5 | 185 | 90 |
| C7 | 16 | 4 | 170 | 90 |
| C7 | 22 | 4 | 180 | 90 |
| C5 | 25 | 5 | 210 | 22 |
| Drying ($N_2$) 15 min | | | | 22→60 |

TABLE 12

| Example 11 | mol · ratio | mmol | ml |
|---|---|---|---|
| BOMAG-A ® (20%/C7) | 1 | 35.01 | 40.00 |
| EHA | 2 | 70.01 | 11.00 |
| EG | 0.5 | 17.50 | 0.98 |
| PDC | 0.5 | 17.50 | 2.52 |
| BOMAG-A (20%/C7) | 0.4 | 14.00 | 16.0 |
| BuCl | 1.1 | 38.28 | 4.00 |
| EVAPORATION | | | condense |
| Toluene | | | 15 |
| $TiCl_4$ (110° C.) | 10 | 350.1 | 38.48 |
| Cooling | | | |

| Washings: | stirr. (min) | settl. (min) | ml | ° C. |
|---|---|---|---|---|
| Toluene | 30 | 15 | 120 | 90 |
| Toluene (+10% $TiCl_4$) | 31 | 6 | 135 | 90 |
| C7 | 05 | 970 | 150 | 90 |
| C7 | 25 | 8 | 205 | 90 |
| C5 | 18 | 4 | 210 | 22 |
| Drying ($N_2$) 37 min | | | | 22→60 |

TABLE 13

| Example 12 | mol · ratio | mmol | ml |
|---|---|---|---|
| BOMAG-A ® (20%/C7) | 1 | 35.01 | 40.00 |
| EHA | 2 | 70.01 | 11.00 |
| Glycerol | 0.5 | 17.50 | 1.29 |
| PDC | 0.5 | 17.50 | 2.52 |
| BuCl | 1.1 | 38.29 | 4.00 |
| EVAPORATION | | | condense |
| Toluene | | | 15.0 |
| $TiCl_4$ (110° C.) | 10 | 350.1 | 38.48 |

| Washings: | stirr. (min) | settl. (min) | ml | ° C. |
|---|---|---|---|---|
| Toluene | 28 | 12 | 120 | 107 |
| Toluene (+10% $TiCl_4$) | 20 | 21 | 140 | 90 |
| C7 | 26 | 11 | 150 | 90 |
| C7 | 24 | 22 | 165 | 90 |
| C5 | 15 | 9 | 170 | 22 |
| Drying ($N_2$) 36 min | | | | 22→60 |

TABLE 14

| Example 13 | mol · ratio | mmol | ml |
|---|---|---|---|
| BOMAG-A ® (20%/C7) | 1 | 35.01 | 40.00 |
| EHA | 2.5 | 87.52 | 13.75 |
| EtOH | 0.1 | 3.50 | 0.20 |
| EG | 0.05 | 1.75 | 0.10 |
| PDC | 0.5 | 17.50 | 2.52 |
| BOMAG-A (20%/C7) | 0.2 | 7.00 | 8.00 |

TABLE 14-continued

| | | | |
|---|---|---|---|
| i-PDC | 0.05 | 1.75 | 0.36 |
| BuCl | 1.1 | 38.28 | 4.00 |
| EVAPORATION | | | |
| Toluene | | | 10 |
| TiCl$_4$(110° C.) | 10 | 350.06 | 38.48 |
| Cooling | | | |

| Washings: | stirr. (min) | settl. (min) | ml | ° C. |
|---|---|---|---|---|
| Toluene | 27 | 25 | 80 | 90 |
| Toluene (+10% TiCl$_4$) | 23 | 20 | 140 | 90 |
| C7 | 25 | 14 | 150 | 90 |
| C7 | 30 | 968 | 190 | 90 |
| C5 | 27 | 22 | 175 | 22 |
| Drying (N$_2$) 40 min | | | | 22→60 |

TABLE 15

| Catalyst | Example 9 | Example 10 | Example 11 | Example 12 | Example 13 |
|---|---|---|---|---|---|
| Mg (wt-%) | 16.3 | 14.1 | 14.1 | 13.7 | 13.9 |
| Mg (mol/100 g catalyst) | 0.671 | 0.580 | 0.580 | 0.564 | 0.572 |
| Ti (wt-%) | 3.3 | 3.0 | 7.1 | 3.3 | 2.7 |
| Ti (mol/100 g catalyst) | 0.069 | 0.063 | 0.148 | 0.069 | 0.056 |
| BEPD (wt-%) | 2.2 | | | | |
| BEPD (mol/100 g catalyst) | 0.014 | | | | |
| EHA (wt-%) | 0.3 | 0.35 | 2.8 | 2.8 | 1.1 |
| EHA (mol/100 g catalyst) | 0.0023 | 0.0027 | 0.0215 | 0.0215 | 0.0084 |
| EtOH (wt-%) | | | | | |
| DOP (wt-%) | 27.7 | 17.6 | 18.4 | 23.2 | 21.8 |
| DOP (mol/100 g catalyst) | 0.071 | 0.045 | 0.047 | 0.059 | 0.056 |
| DEP (wt-%) | | | | | |
| DEP (mol/100 g catalyst) | | | | | |
| Mg (mol Mg/mol Ti) | 9.7 | 9.3 | 3.9 | 8.2 | 10.1 |
| Donor (mol Donor/mol Ti) | 1.0 | 0.7 | 0.3 | 0.9 | 1.0 |
| Diol | BEPD | EG | EG | Glycerol | EG + EtOH |
| Activ. (kg PP/g cat) | 26.0 | 33.8 | 13.1 | 21.2 | 20.0 |
| Activ. (kg PP/g Ti) | 788 | 1127 | 184 | 642 | 743 |
| BB (kg/m$^3$) | 330 | 380 | 410 | 310 | 380 |
| MFR$_2$ (g/10 min) | 8.8 | 6.7 | 7.5 | 7.9 | 11.4 |
| XS (wt-%) | 4.1 | 2.75 | | | |

The resulting yields in the catalyst synthesis were high.

The amounts of Ti in these catalysts are also shown in FIG. 8.

No additional amount of DEP could be found in the catalyst of example 13. This example was the only one where DEP could be expected to be found because some ethanol had been added.

The % of polymer (=di-, oligo- or polyester), calculated as 100%-% known species are correlated to the number of —OH groups in the added alcohol in FIG. 9, where (1) refers to EHA, (2) to ethylene glycol and (3) to glycerol.

The molar ratios between Mg, Ti and the donor are shown in FIG. 10, where Ti is presented in the first column, Mg in the second column and donor in the third column. The Figure shows that the catalysts can be divided into two groups, one group where the Mg:Ti:Donor ratio is close to 9:1:1 and a second group where less Mg is present.

The activities of the catalysts are shown in FIG. 11 in kg PP/g.cat. The catalysts can be divided into two groups depending on their activity, one group showing a high activity of above 20 kg PP/g cat and a second group showing lower activity.

The particle size distribution (PSD) of the polymer sample was measured using a Fritsch Pulverisette equipment with a sieving set consisting of 5, 4, 2, 1, 0.5, 0.18, 0.1, 0.056, 0.036 mm sieves+pan (<0.036 mm).

FIGS. 12a–12e show the PSD (particle size distribution) diagrams for the five polymers achieved with the catalysts in this test series. The results showed that the catalysts of examples 10, 11 and 12, showed a clearly narrower PSD compared to the catalysts of examples 9 and 13.

A more narrow particle size distribution (PSD) can be produced with ethylene glycol. The main particle size (PS) is then 1 mm.

Very good activities can be reached when using ethylene glycol in the catalyst synthesis. Activities of almost 34 kg PP/g cat were achieved.

Examples 14 to 17

All the chemicals used were identical to the chemicals used in previous examples. The only chemical not defined earlier but used in this study was 1,4-dichlorobutane (DCB) from Fluka (35570) that was used as a reactive halogenated hydrocarbon.

Preparation of the Catalysts

The preparation of the catalysts was started by adding 40.0 ml (35.01 mmol) of MgR$_2$ (BOMAG-A®) to a 250 ml glass reactor. To this a mixture of both the mono alcohol and the diol, i.e. 11.0 ml (70.01 mmol) of EHA and 17.50 mmol of either BEPD or EG was added. The temperature of the reaction solution was increased to 60° C. and the reaction components were allowed to react with each other for 30 min. After this 2.52 ml (17.50 mmol) of PDC was added at 25° C. Again, the temperature was raised to 60° C. and the components allowed to react for 30 min. The heptane was now evaporated from the reaction solution at a temperature of 105° C., this to improve the reaction possibilities for the chlorinated hydrocarbons. After the evaporation of the heptane 45.67 mmol (5.0 ml) of either BuCl or DCB was added. The molar ratio between Mg and the chlorination agent was thus about 1:1.3 in both cases. After a 30 min reaction time 20.0 ml (188 mmol) of toluene was added. This Mg complex solution was then added dropwise to 38.48 ml (350.1 mmol) of TiCl$_4$ at 110° C. The components were allowed to react with each other for 10 min after which the solution was cooled down to 105° C. and 150 ml of toluene was added. After this the formed precipitate was allowed to settle. The settling time and the precipitate volume were recorded.

When the settling step was complete the clear solution was siphoned off and the precipitate washed first once with 150 ml of toluene at 90° C. for 30 min, then twice with 150 ml of heptane at 90° C. for 30 min and last with 150 ml of pentane at room temperature for 20 min. Last, the catalyst was dried under a stream of nitrogen. The experimental setup, i.e. when BEPD or EG or when ButCl or DCB have been used in this test series, are listed in Table 16.

TABLE 16

The experimental setup of examples 14 to 17

| Example | Diol used | Chlorinated hydrocarbon used |
|---|---|---|
| 14 | BEPD | DCB |
| 15 | EG | DCB |
| 16 | BEPD | BuCl |
| 17 | EG | BuCl |

The yield of the catalyst mass from the catalyst synthesis was calculated on the basis of how much Mg was fed into the synthesis in the form of $MgR_2$ (0.8507 g) and by comparing this amount with the amount of Mg found in the resulting catalyst. The results are listed in Table 17. In Tables 18, 19 and 20 are listed the results of the catalyst analyzes: Mg, Ti and DOP %, molar ratios Mg:Ti:DOP and calculated and measured Cl contents, respectively.

TABLE 17

The yield percent of the catalysts of examples 14 to 17

| Example | Yield of catalyst (g) | Calculated yield[1] |
|---|---|---|
| 14 | 6.0 | 91 |
| 15 | 3.4 | 69 |
| 16 | 5.7 | 99 |
| 17 | 6.8 | 98 |

[1]Calculations based on: Yield % = (Catalyst yield (g) * Mg %)/0.8507 (g)

TABLE 18

The Mg, Ti and DOP in the catalysts of examples 14 to 17

| | Example | | | |
|---|---|---|---|---|
| | 14 | 15 | 16 | 17 |
| Mg (wt-%) | 12.9 | 17.3 | 14.9 | 12.2 |
| Mg (mol/100 g catalyst) | 0.53 | 0.71 | 0.61 | 0.50 |
| Ti (wt-%) | 3.6 | 3.7 | 2.2 | 4.1 |
| Ti (mol/100 g catalyst) | 0.08 | 0.08 | 0.05 | 0.09 |
| DOP (wt-%) | 30.9 | 22.4 | 27.9 | 29.8 |
| DOP (mol/100 g catalyst) | 0.08 | 0.06 | 0.07 | 0.08 |

TABLE 19

The molar ratios between Mg:Ti:DOP in the catalysts of examples 14 to 17

| | Examples | | | |
|---|---|---|---|---|
| | 14 | 15 | 16 | 17 |
| Mg | 7.1 | 9.2 | 13.4 | 5.9 |
| Ti | 1 | 1 | 1 | 1 |
| DOP | 1.05 | 0.74 | 1.56 | 0.89 |

TABLE 20

The calculated amount of Cl compared to the measured amounts of Cl in examples 14 to 17

| | Example | | | |
|---|---|---|---|---|
| | 14 | 15 | 16 | 17 |
| Cl (wt-%), calculated | 37.7 | 50.5 | 43.5 | 35.6 |
| Cl (wt-%), measured | 47.1 | 50.5 | 52.5 | 48.8 |

The polymerization results are listed in Table 21 together with figures about the MFR and BD of the polymers.

TABLE 21

Test polymerization results from bulk test polymerization of examples 14 to 17

| | Example | | | |
|---|---|---|---|---|
| | 14 | 15 | 16 | 17 |
| Activity (kg PP/g cat.) | 24.1 | 28.0 | 21.8 | 23.0 |
| Activity (kg PP/g Ti) | 669 | 758 | 989 | 562 |
| MFR 2.16 kg (g/10 min) | 6.3 | 8.3 | 8.4 | 7.4 |
| BD (kg/m$^3$) | 290 | 310 | 300 | 410 |

The polymerization results showed that if the BEPD diol is exchanged to EG, this has a positive effect on the activity of the catalyst. In the case BuCl was used as chlorinated hydrocarbon there was an activity increase from 21.8 to 23.0 kg PP/g cat., and if the DCB had been used as the chlorinated hydrocarbon there was an activity increase from 21.8 to 28.0 kg PP/g cat., thus showing a 28% activity increase in the best case.

The polymerization results also showed that when using the DCB as chlorinated hydrocarbon a higher activity was achieved compared to when using BuCl. This was the case both when using BEPD and when using EG as diol. In the former case the activity increased from 21.8 to 24.1 kg PP/g cat, and in the later case the activity increased from 23.0 to 28.0 kg PP/g cat, i.e. a 22% increase in activity.

In Table 22 the Mg/Ti molar ratio in the catalysts is compared to the activities of the catalysts. According to the results there is a steady growth in activity the higher the Mg/Ti molar ratio. Here an increase in activity from 23.0 kg PP/g cat for the ratio of 5.9 to 28.0 kg PP/g cat for the Mg/Ti ratio of 9.2 is seen.

TABLE 22

The molar ratios between Mg:Ti in the catalysts and their activities

| | Example | | | |
|---|---|---|---|---|
| | 14 | 15 | 16 | 17 |
| Mg/Ti | 7.1 | 9.2 | 13.4 | 5.9 |
| Activity (kg PP/g cat.) | 24.1 | 28.0 | 21.8 | 23.0 |
| Activity (kg PP/g Ti) | 669 | 758 | 989 | 562 |

In Table 23 the DOP/Ti molar ratio is listed together with the activity values for the catalysts. The results showed that the lower the DOP/Ti ratio the higher the activity.

In Table 23 an increase in activity from 21.8 kg PP/g cat to 28.0 kg PP/g cat is seen when the molar ratio of DOP/Ti decreases from 1.6 to 0.7.

TABLE 23

Correlation between the DOP/Ti ratio and the activity of the catalysts

| Example | DOP/Ti (mol/mol) | Activity (kg PP/g cat) |
|---|---|---|
| 14 | 0.7 | 24.1 |
| 15 | 0.9 | 28.0 |
| 16 | 1.0 | 21.8 |
| 17 | 1.6 | 23.0 |

In Table 24 the particle size fractions in the test polymers are listed.

TABLE 24

The PS fractions in the test polymers of examples 14 to 17 as % of polymer on sieve

| | Example | | | |
|---|---|---|---|---|
| Sieve size/mm | 14 | 15 | 16 | 17 |
| 5.0 | 9.5 | 5.7 | 1.3 | 2.3 |
| 4.0 | 2.1 | 1.7 | 0.2 | 3.5 |
| 2.0 | 4.6 | 9.3 | 1.8 | 26.0 |
| 1.0 | 4.6 | 16.4 | 2.3 | 27.3 |
| 0.5 | 6.8 | 16.2 | 11.0 | 16.2 |
| 0.18 | 45.8 | 25.2 | 76.4 | 18.6 |
| 0.10 | 19.0 | 19.1 | 6.2 | 5.0 |
| 0.056 | 7.0 | 6.4 | 0.8 | 1.0 |
| 0.036 | 0.6 | 0.2 | 0.1 | 0.1 |
| <0.036 | 0.0 | 0.0 | 0.0 | 0.0 |

The results showed a drastic difference in the PSD depending on which diol had been used. If BEPD had been used the main PS fraction was on the 0.18 mm sieve, if EG had been used the main PS fraction was on the 1 to 0.18 mm sieve. This effect was even more pronounced when BuCl had been used as chlorination agent compared to DCB. The results also showed that if BEPD had been used, the PSD was very sharp, up to 75% of the particles could be found on one sieve, the 0.18 mm sieve. Again if EG had been used the PSD was much broader and only about 25% of the material could be found on the main sieve, i.e. the 1 mm sieve. This can clearly be seen in Table 25 where the percent material representing the biggest fractions in the polymer PSD are listed (i.e. the fractions on the 0.18 mm and the 1 mm sieves).

TABLE 25

The percent of the polymer material in the two main fractions of the PSD

| Example | % at 0.18 mm sieve | % at 1 mm sieve |
|---|---|---|
| 14 | 45.8 | 4.6 |
| 15 | 25.2 | 16.4 |
| 16 | 76.4 | 2.3 |
| 17 | 18.6 | 27.3 |

For comparison a catalyst was prepared in the absence of diol. When this kind of catalyst is used in polymerization the polymer particles tend to form agglomerates giving a broad PSD of the resulting polymer material. This is shown in a polymer PSD that has been produced with said catalyst. When replacing a part of the monoalcohol (EHA) used in this recipe with a diol a much narrower PSD can be achieved. The recipe is presented in Table 26 and the results of the sieve operation is presented in Table 27.

TABLE 26

| Comparative example | mole ratio | mmol | ml |
|---|---|---|---|
| BOMAG-A ® (20%/C7) | 1 | 26.55 | 30.0 |
| EHA | 2 | 53.10 | 8.3 |
| PDC | 1 | 26.55 | 3.8 |
| TiCl$_4$ (95° C.) | 10 | 265.5 | 29.2 |
| Toluene | | | 80 + 60 |
| Washings: | Time (min) | ml | ° C. |
| Toluene | 50 | 148 | 90 |
| Toluene | 15 | 56 | 22→85 |
| C7 | 32 | 68 | 22→85 |
| C7 | 32 | 50 | <35 |
| C5 | 15 | 60 | 22 |
| Drying (N$_2$) 42 mill | | | 22→55 |

TABLE 27

| Sieve size/mm | wt-% |
|---|---|
| 5.0 | 11 |
| 4.0 | 3 |
| 2.0 | 9 |
| 1.0 | 14 |
| 0.5 | 22 |
| 0.18 | 30 |
| 0.10 | 8 |
| 0.056 | 2 |
| 0.036 | 0 |
| <0.036 | 0 |

The bulk density values (BD) for the polymers listed in Table 21 showed that there was a strong correlation between the bulk density and the diol used in the synthesis. If EG had been used the BD was higher. This shows up as a BD increase from 290 to 310 when going from example 14 to example 17, i.e. from BEPD to EG and as a BD increase from 300 to 410 when going from example 16 to example 17, i.e. from BEPD to EG.

Conclusions 1. (1,4)-butyl-dichloride gives up to 20% higher activity to the catalyst compared to BuCl
2. EG gives 30% higher catalyst activity compared to BEPD
3. EG gives a coarse and a fine catalyst precipitate fraction, BEPD gives only a fine
4. EG gives faster settling time for the catalyst precipitate, BEPD gives slower settling time
5. EG gives smaller catalyst precipitate volume than BEPD
6. EG gives main PS of PP at 1 mm, BEPD at 0.18 mm
7. BEPD gives very narrow PSD of PP at 0.18 mm, EG gives broad at 1 mm
8. EG gives BD of 400, BEPD gives BD of 300
9. Optimum Mg/Ti is about 9
10. Optimum DOP/Ti is between 0.7 and 1.3

Examples 18 and 19

All the chemicals used were identical to the chemicals used in previous examples, except for the magnesium dichloride MgCl$_2$.

Preparation of the Catalysts

The preparation of the catalysts was started by adding 1,2 g (12,6 mmol) of MgCl$_2$, 2,1 g (13,1 mmol) BEPD and 8,2 ml (52,5 mmol) EHA to a glass reactor equipped with a magnetic stirrer. The mixture was heated up to 145° C. and mixed until a clear solution was obtained. The solution was cooled down and 2 ml of toluene was added.

Half of the solution was taken into a 50 ml glass reactor equipped with a stirrer. 18.0 ml (15.8 mmol) in example 18 and 16.0 ml (14 mmol) in example 19 of $MgR_2$ (BOMAG-A®) was added while the temperature was kept between 5 to 10° C. The temperature of the reaction solution was increased to 60° C. and 1.0 ml (7.0 mmol) of PDC was added. After the reaction was completed, 1.5 ml (14.3 mmol) BuCl was added. After 5 min the temperature was rised to 95–97° C. and about half of the liquid was evaporated with nitrogen stream. After evaporation 4.0 ml of toluene was added and the solution was then cooled down to room temperature.

This Mg complex solution was then added dropwise to 15.0 ml (136 mmol) of $TiCl_4$ at 110° C. The components were allowed to react with each other for 15 min after which the solution was cooled down to 90° C. and 20 ml of toluene was added. After one hour, the formed precipitate was allowed to settle. When the settling step was complete the clear solution was siphoned off and the precipitate washed first once with toluene at 90° C., then twice with heptane at 90° C. Last, the catalyst was dried under a stream of nitrogen. The results are summarized in Table 28.

TABLE 28

| Catalyst | Example 18 | Example 19 |
|---|---|---|
| Mg (wt-%) | 12.4 | 14.3 |
| Ti (wt-%) | 5.4 | 2.3 |
| DOP (wt-%) | 24.1 | 29.5 |
| Activ. (kg PP/g cat) | 23.4 | 16.4 |
| BD (kg/m$^3$) | 430 | 420 |
| MFR$_2$ (g/10 min) | 5.6 | 5.9 |
| XS (wt-%) | 2.6 | 3.8 |

Examples 20 and 21

All the chemicals used were identical to the chemicals used in previous examples, expect the 2,2-dimethyl-1,3-propanediol was used instead of BEPD.

Preparation of the Catalysts

The preparation of the catalysts was started by adding 0,5 g (4,8 mmol) of 2,2-dimethyl-1,3-propanediol and 3,0 ml (19,1 mmol) in example 20 and 1,8 ml (11,5 mmol) in example 21 of 2-ethyl hexanol to a glass reactor equipped with a magnetic stirrer. The mixture was heated up to 60° C. and 11,0 ml (9,6 mmol) of BOMAG® was added. Then 1.4 ml (9,7 mmol) of PDC was added. After the reaction was completed, 1.2 ml (11.5 mmol) BuCl was added. About half of the liquid was evaporated with nitrogen stream.

This Mg complex solution was then added dropwise to 10.6 ml (96,5 mmol) of $TiCl_4$ at 110° C. The components were allowed to react with each other for 10 min after which the solution was cooled down to 90° C. and 40,7 ml of toluene was added. After 30 min, the formed precipitate was allowed to settle. When the settling step was complete, the clear solution was siphoned off and the precipitate washed first once with toluene at 90° C., then twice with heptane at 90° C. and once with pentane at room temperature. Last, the catalyst was dried under a stream of nitrogen and polymerized according to the above described process. The results are summarized in Table 29.

TABLE 29

| Catalyst | Example 20 | Example 21 |
|---|---|---|
| Mg (wt-%) | 9.2 | 10.3 |
| Ti (wt-%) | 5.7 | 7.8 |
| DOP (wt-%) | 18.5 | 16.5 |
| Activ. (kg PP/g cat) | 2.3 | 0.7 |
| BD (kg/m$^3$) | 310 | |
| MFR$_2$ (g/10 min) | 11.3 | |

Examples 22 and 23

All the chemicals used were identical to the chemicals used in previous examples.

Preparation of the Catalysts

The preparation of the catalyst in example 22 was started by adding 9,0 ml (57,4 mmol) of 2-ethyl hexanol to a glass reactor equipped with a magnetic stirrer. 32,0 ml (28,0 mmol) of BOMAG® was added while keeping the temperature under 10° C. The temperature was rised to 60° C. and 2,0 ml (13,8 mmol) of PDC was added. After the reaction was completed, about half of the liquid was evaporated with nitrogen stream and 8 ml of toluene was added.

The preparation of the catalyst in example 23 was started by adding 4,5 g (28,3 mmol) of BEPD to a glass reactor equipped with a magnetic stirrer. 32,0 ml (28,0 mmol) of BOMAG® was added while keeping the temperature under 10° C. The temperature was rised to 60° C. and 4,0 ml (28,0 mmol) of PDC was added. After the reaction was completed, about half of the liquid was evaporated with nitrogen stream and the product was washed with toluene and dried.

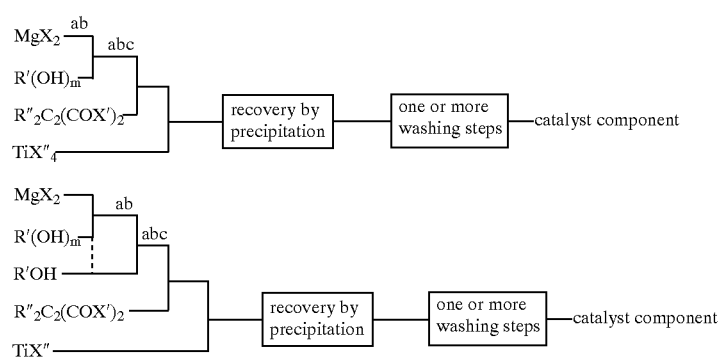

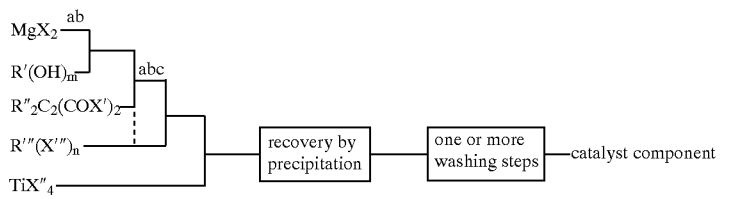

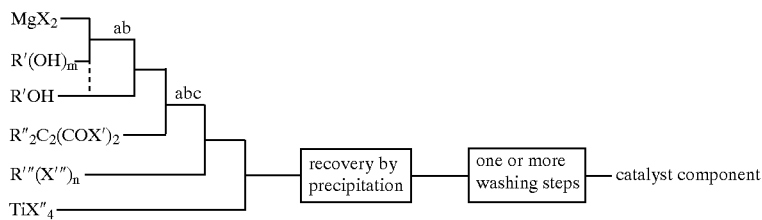

Appendix 1. Four embodiments starting from $MgX_2$. Four further embodiments are obtained when $TiX''_4$ is reacted with ab in stead of abc and the product is finally reacted with $R''_2C_2(COX')_2$ and optionally $R'''(X''')_n$.

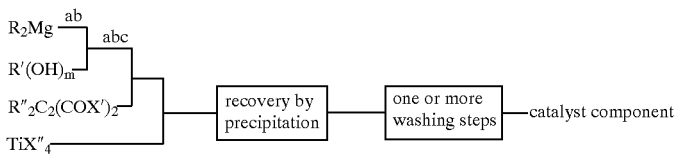

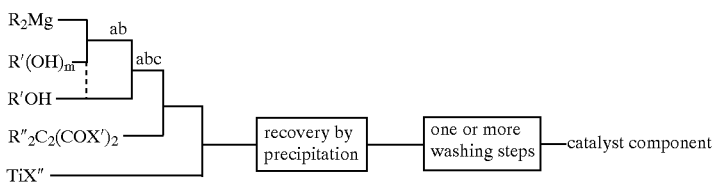

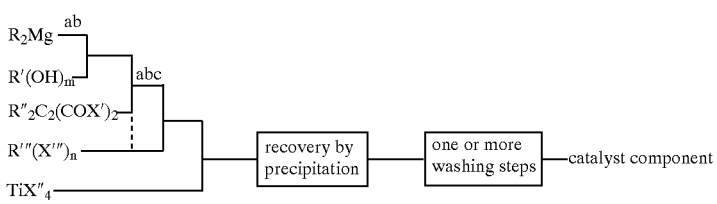

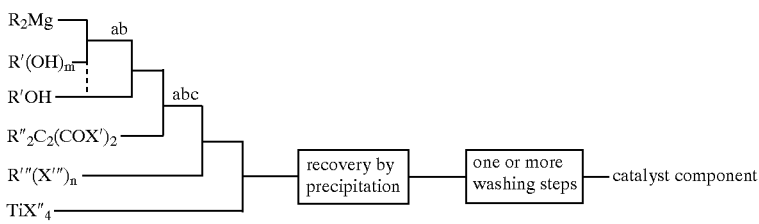

Appendix 2. Four embodiments starting from $R_2Mg$. Four further embodiments are obtained when $TiX''_4$ is reacted with ab in stead of abc and the product is finally reacted with $R''_2C_2(COX')_2$ and optionally $R'''(X''')_n$.

What is claimed is:

1. A process for the preparation of an olefin polymerization catalyst component comprising a magnesium dihalide, a titanium tetrahalide, and a dicarboxylic acid di-, oligo- and/or polyester as internal electron donor ED, comprising the steps of:

(i) reacting in solution at least one magnesium compound (a), selected from the group consisting of a dialkyl magnesium $R_2Mg$, an alkyl magnesium alkoxide RMgOR, wherein each R is a similar or different $C_1$–$C_{20}$ alkyl, and a magnesium dihalide $MgX_2$, wherein X is a halogen, with at least one alcohol (b) selected from the group consisting of at least one polyhydric alcohol $R'(OH)_m$, and a mixture of at least one monohydric alcohol $R'OH$ and at least one polyhydric alcohol $R'(OH)_m$, wherein each R' is the same or different 1-valent or, respectively, m-valent $C_1$–$C_{20}$ hydrocarbyl group and m is an integer from 2 to 6, to give a first intermediate (ab), (ii) reacting in solution said first intermediate (ab) with at least one dicarboxylic acid dihalide (c) which forms essentially all of said carboxylic acid di-, oligo- and/or polyester and has the formula (1):

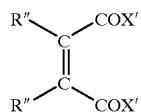 (1)

wherein each R" is a similar or different C1–C20 hydrocarbyl group or both R":s form together with the two unsaturated carbons of the formula a C5–C20 aliphatic or aromatic ring, and X' is a halogen, to give a second intermediate (abc), and (iii) reacting said second intermediate (abc) with at least one titanium tetrahalide $TiX''_4$(d) wherein X" is a halogen, (iv) recovering by precipitation said catalyst component in crude form or a precursor of said catalyst component, and (v) optionally washing said crude catalyst component or said precursor, to obtain said catalyst component.

2. A process according to claim 1, wherein at least one of steps (i) to (iii) are performed in solution, by using one or several hydrocarbon solvents and optionally applying stirring and/or heat.

3. A process according to claim 1 or 2, wherein in step (iv), said catalyst component is recovered by precipitation from said hydrocarbon solution.

4. A process according to claim 1 or 2, wherein said polyhydric alcohol $R'(OH)_m$, of step (i), R' is a di-, tri- or tetravalent $C_2–C_{16}$ alkyl group and m is an integer from 2 to 4.

5. A process according to claim 1, wherein in step (i), said magnesium compound (a) is reacted with said alcohol (b) which is polyhydric alcohol $R'(OH)_m$, in a molar ratio $Mg/R'(OH)_m$ of between 1:1 and 1:0.25.

6. A process according to claim 1, wherein in step (i), said magnesium compound (a) is reacted with at least two of said alcohols (b), one of which is said monohydric alcohol R'OH and the other of which is said polyhydric alcohol $R'(OH)_m$.

7. A process according claim 1, wherein in step (i), said magnesium compound (a) is reacted with said at least one alcohol (b), under at least one of the following conditions:

at raised temperature at about 30° C. to about 80° C., for a period of about 10 min to about 90 min, and in the presence of a $C_5–C_{10}$ hydrocarbon solvent.

8. A process according to claim 1, wherein said monohydric alcohol is an alcohol of the formula R'OH in which R' is a $C_2–C_{16}$ alkyl group.

9. A process according to claim 1, wherein said magnesium compound (a) in step (i) is reacted with said monohydric alcohol R'OH, in a molar ratio Mg/ROH of between 1:4 and 1:1.

10. A process according to claim 1, wherein said magnesium compound (ab) is provided by reacting, in any order, a dialkyl magnesium $R_2Mg$ and a magnesium dihalide $MgX_2$ with at least one alcohol (b), selected from the group consisting of polyhydric alcohols $R'(OH)_m$, wherein R' is an m-valent $C_1–C_{20}$ hydrocarbyl group and m is an integer selected from 2 to 6.

11. A process according to claim 1, wherein said magnesium compound (a) is a dialkyl magnesium $R_2Mg$, in which each R is a similar or different $C_4–C_{12}$ alkyl group.

12. A process according to claim 1, wherein said magnesium compound (a) is magnesium dichloride.

13. A process according to claim 1, wherein in said dicarboxylic acid dihalide (c) of the formula (1), both R":s form together with the two unsaturated carbons of said formula (1) a $C_5–C_{20}$ aliphatic or $C_6–C_{20}$ aromatic ring, and X' is chlorine.

14. A process according to claim 1, wherein in step (ii), said first intermediate (ab) is reacted with said dicarboxylic acid dihalide (c) in a molar ratio $Mg_{total\ added}/(c)$ between 1:1 and 1:0.1.

15. A process according to claim 1, wherein in step (ii), said first intermediate (ab) is reacted with said dicarboxylic acid dihalide (c), under at least one of the following conditions:

adding said dicarboxylic acid dihalide (c) under room temperature and heating the obtained reaction mixture, keeping the reactants together at raised temperature of about 30° C. to about 80° C., keeping the reactants together for a period of about 10 min to about 90 min, reacting the reactants in the presence of a $C_5C_{10}$ hydrocarbon solvent.

16. A process according to claim 15, wherein after said first intermediate (ab) has been reacted with said dicarboxylic acid dihalide (c), said $C_5–C_{10}$ hydrocarbon solvent is removed by evaporation, at about 100° C. to about 110° C.

17. A process according to claim 1, further comprising adding in connection with at least any one of steps (i) to (iii), at least one reactive halogenated hydrocarbon (e) of the formula (2)

$$R'''X'''_n \quad (2)$$

wherein R''' is an n-valent $C_1–C_{20}$ hydrocarbyl group, X''' is a halogen and n is an integer from 1 to 4.

18. A process according to claim 17, wherein in said reactive halogenated hydrocarbon (e) of the formula (2), R''' is a mono- or bivalent $C_{1–C10}$ hydrocarbyl group, X''' is chlorine and n is 1 or 2.

19. A process according to claim 17 or 18, wherein said reactive halogenated hydrocarbon (e) is added in an amount corresponding to a molar ratio $Mg_{total\ added}/(e)$ between 1:0.2 and 1:20.

20. A process according to claim 17, wherein said reactive halogenated hydrocarbon (e) is added in connection with step (ii).

21. A process according to claim 15 or 20, wherein after said $C_5–C_{10}$ hydrocarbon solvent has been removed by evaporation, said second intermediate (abc) is contacted with said reactive halogenated hydrocarbon (e) for a period of about 10 min to about 90 min.

22. A process according to claim 21, wherein to said second intermediate (abc) or its contact product with said reactive halogenated hydrocarbon (e), a dissolving $C_5–C_{10}$ hydrocarbon is added in a molar ratio $Mg_{total\ added}$/toluene of between about 1:2 and about 1:10.

23. A process according to claim 1, wherein in step (iii), said titanium tetrahalide (d) is titanium tetrachloride.

24. A process according to claim 1, wherein in step (iii) said second intermediate (abc) is reacted with said titanium tetrahalide (d) in a molar ratio $Mg_{total\ added}/(d)$ between 1:100 and 1:1.

25. A process according to claim 1, wherein in step (iii) said second intermediate (abc) is added slowly to said titanium tetrahalide (d), which is hot to form a solution of said catalyst component.

26. A process according to claim 22 or 25, wherein said toluene solution of said second intermediate (abc), or its contact product with said reactive halogenated hydrocarbon (e), is added dropwise to said titanium tetrahalide (d).

27. A process according to claim 26, wherein said second intermediate (abc), or its contact product with said reactive halogenated hydrocarbon (e), is contacted with said titanium tetrahalide (d) for about 5 min to about 20 min.

28. A process according to claim 1, wherein in step (iv), said catalyst component in crude form or a precursor of said catalyst component is recovered by cooling a solution of said catalyst component, for the precipitation of said crude catalyst component or said precursor thereof and allowing it to settle.

29. A process according to claim 28, wherein immediately before said precipitation, a $C_5$–$C_{10}$ hydrocarbon solvent is added to said catalyst component solution.

30. A process according to claim 28 or 29, wherein after said crude catalyst component or said precursor thereof has settled, the supernatant liquid is removed by decantering or siphoning.

31. A process according to claim 1, wherein in step (v), said recovered crude catalyst component or said precursor thereof is washed with hot toluene at a temperature of 90° C.

32. A process according to claim 1, wherein in step (v), said recovered crude catalyst component or said precursor thereof is washed with hot heptane at a temperature of 90° C.

33. A process according to claim 1, wherein in step (v), said recovered crude catalyst component or precursor thereof is washed with pentane.

34. A process according to claim 1, wherein in step (v) said recovered crude catalyst component or precursor thereof is washed until achieving the following ratio of said magnesium dihalide, said titanium tetrahalide, and said dicarboxylic acid di-, oligo- and/or polyester as internal electron donor ED (3):

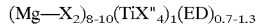

$$(Mg\text{—}X_2)_{8\text{-}10}(TiX''_4)_1(ED)_{0.7\text{-}1.3}$$

wherein $MgX_2$ is magnesium dihalide, $TiX''_4$ is titanium tetrahalide, X and X" are Cl, and ED is dicarboxylic acid di-, oligo- and/or polyester as an internal electron donor, whereby said recovered catalyst component is washed first with hot toluene, then at least twice with hot heptane, and finally with pentane.

35. A process according to claim 1, wherein the washed catalyst component is dried by evaporation.

36. The process of claim 4, wherein the polyhydric alcohol is selected from the group consisting of ethylene glycol, 2-butyl-2-ethyl-1,3-propanediol and glycerol.

37. The process of claim 5, wherein the molar ratio $Mg/R'(OH)_m$ is between about 1:0.8 and about 1:0.3.

38. The process of claim 7, wherein the reaction takes place for 30 min.

39. The process of claim 7, wherein the reaction takes place in the presence of heptane.

40. The process of claim 8, wherein R' is a $C_4$–$C_{12}$ alkyl group.

41. The process of claim 8, wherein the monohydric alcohol (b) is 2-ethyl-1-hexanol.

42. The process of claim 9, wherein the molar ratio is between about 1:2.5 and about 1:1.5.

43. The process of claim 11, wherein one R is a butyl group and the other R is an octyl group.

44. The process of claim 13, wherein said dicarboxylic acid dihalide (c) is phthaloyl dichloride.

45. The process of claim 14, wherein the molar ratio is between about 1:0.6 and about 1:0.25.

46. The process of claim 15, wherein the reactants are reacted in the presence of heptane.

47. The process of claim 15, wherein said $C_5$–$C_{10}$ hydrocarbon solvent is heptane.

48. The process of claim 18, wherein the hydrocarbyl halide (e) is selected from the group consisting of butyl chloride and (1,4)-dichlorobutane.

49. The process of claim 19, wherein the molar ratio is between about 1:1 and about 1:4.

50. The process of claim 21, wherein said $C_5$–$C_{10}$ hydrocarbon solvent is heptane and the reaction period is 30 min.

51. The process of claim 22, wherein the $C_5$–$C_{10}$ hydrocarbon is toluene.

52. The process of claim 24, wherein the molar ratio is between about 1:50 and about 1:5.

53. The process of claim 29, wherein the $C_5$–$C_{10}$ hydrocarbon solvent is toluene in a molar ratio $Mg_{total\ added}$/toluene of about 1:10 to about 1:100.

* * * * *